US012809018B2

(12) United States Patent
Kuroda et al.

(10) Patent No.: US 12,809,018 B2
(45) Date of Patent: Nov. 24, 2026

(54) ELECTRONIC DEVICE, METHOD FOR CONTROLLING ELECTRONIC DEVICE, AND PROGRAM

(71) Applicant: KYOCERA Corporation, Kyoto (JP)

(72) Inventors: Jun Kuroda, Kodaira (JP); Tooru Sahara, Yokohama (JP); Kenji Yamamoto, Yokohama (JP); Takuya Homma, Yokohama (JP); Fangwei Tong, Fukuoka (JP)

(73) Assignee: KYOCERA Corporation, Kyoto (JP)

( * ) Notice: Subject to any disclaimer, the term of this patent is extended or adjusted under 35 U.S.C. 154(b) by 208 days.

(21) Appl. No.: 18/711,034

(22) PCT Filed: Nov. 7, 2022

(86) PCT No.: PCT/JP2022/041428
§ 371 (c)(1),
(2) Date: May 16, 2024

(87) PCT Pub. No.: WO2023/090192
PCT Pub. Date: May 25, 2023

(65) Prior Publication Data

US 2025/0004125 A1 Jan. 2, 2025

(30) Foreign Application Priority Data

Nov. 18, 2021 (JP) ................................ 2021-188191

(51) Int. Cl.
*G01S 13/88* (2006.01)
*G01S 13/44* (2006.01)
(Continued)

(52) U.S. Cl.
CPC ............ *G01S 13/88* (2013.01); *G01S 13/449* (2013.01); *G01S 13/581* (2013.01); *G01S 13/62* (2013.01)

(58) Field of Classification Search
CPC ...... G01S 13/88; G01S 13/449; G01S 13/581; G01S 13/62
See application file for complete search history.

(56) References Cited

U.S. PATENT DOCUMENTS 5,030,956 A 7/1991 Murphy
5,764,192 A * 6/1998 Fowler .................... H01Q 3/24
343/705

(Continued)

FOREIGN PATENT DOCUMENTS

EP 3893019 A1 10/2021
JP H03-73130 A 3/1991

(Continued)

*Primary Examiner* — Vladimir Magloire
*Assistant Examiner* — Hailey R Le
(74) *Attorney, Agent, or Firm* — Studebaker Brackett PLLC

(57) ABSTRACT

An electronic device includes a transmission antenna, a plurality of reception antenna arrays, and a signal processor. The transmission antenna transmits a transmission wave. Each of the plurality of reception antenna arrays includes a plurality of reception antennas each configured to receive a reflected wave. The reflected wave is the transmission wave having been reflected. The signal processor detects, based on a transmission signal transmitted as the transmission wave and a reception signal received as the reflected wave, displacement of a subject reflecting the transmission wave. The plurality of reception antenna arrays is arranged in different orientations from one another. The signal processor synthesizes the displacement of the subject detected by each of the plurality of reception antenna arrays.

12 Claims, 15 Drawing Sheets

(51) Int. Cl.
*G01S 13/58* (2006.01)
*G01S 13/62* (2006.01)

(56) References Cited

U.S. PATENT DOCUMENTS

| | | | | |
|---|---|---|---|---|
| 11,349,190 | B2 | 5/2022 | Tsai | |
| 2010/0130873 | A1* | 5/2010 | Yuen | A61B 5/113 600/595 |
| 2013/0135137 | A1* | 5/2013 | Mulder | G01S 3/48 342/28 |
| 2013/0147654 | A1 | 6/2013 | Choi et al. | |
| 2014/0168003 | A1* | 6/2014 | Lindalv | H01Q 21/062 342/107 |
| 2015/0112185 | A1* | 4/2015 | Sumi | A61B 8/08 600/411 |
| 2016/0054438 | A1* | 2/2016 | Patole | G01S 7/35 342/127 |
| 2016/0103214 | A1* | 4/2016 | Clark | G01S 13/723 342/59 |
| 2018/0149736 | A1* | 5/2018 | Alland | H01Q 21/28 |

FOREIGN PATENT DOCUMENTS

| | | | |
|---|---|---|---|
| JP | 2013-113603 | A | 6/2013 |
| TW | 1746218 | B | 11/2021 |
| WO | 2021/090286 | A1 | 5/2021 |

* cited by examiner

ELECTRONIC DEVICE, METHOD FOR CONTROLLING ELECTRONIC DEVICE, AND PROGRAM

CROSS-REFERENCE TO RELATED APPLICATIONS

This application claims priority from Japanese Patent Application No. 2021-188191 filed in Japan on Nov. 18, 2021, the entire disclosure of which is incorporated herein by reference.

TECHNICAL FIELD

The present disclosure relates to an electronic device, a method for controlling an electronic device, and a program.

BACKGROUND OF INVENTION

For example, in fields of automobile-related industries and the like, a technology for measuring a distance between a vehicle of interest and a predetermined object, and the like, is regarded as important. More particularly, various studies have recently been conducted on a radar (Radio Detecting and Ranging) technology for measuring a distance, etc. to an object such as an obstacle by transmitting a radio wave such as a millimeter wave and then receiving a wave reflected off the object. The importance of such a technology for measuring a distance, etc. is expected to grow more and more in the future with progresses of technologies for assisting drivers in driving and autonomous-driving-related technologies for partially or entirely automating driving.

Various suggestions have been made regarding a technology for detecting the presence, etc. of a predetermined object by receiving a reflected wave coming back from the object due to reflection of a transmitted radio wave. For example, Patent Literature 1 proposes a microwave imaging system configured to image a status of a detection target to enable evaluation thereof. As another example, Patent Literature 2 proposes a method of performing medical image processing by using a radar signal.

CITATION LIST

Patent Literature

Patent Literature 1: Japanese Unexamined Patent Application Publication No. 2013-113603
Patent Literature 2: Japanese Unexamined Patent Application Publication No. H3-73130

SUMMARY

In one embodiment, an electronic device includes a transmission antenna, a plurality of reception antenna arrays, and a signal processor.

The transmission antenna transmits a transmission wave.

Each of the plurality of reception antenna arrays includes a plurality of reception antennas each configured to receive a reflected wave. The reflected wave is the transmission wave having been reflected.

The signal processor detects, based on a transmission signal transmitted as the transmission wave and a reception signal received as the reflected wave, displacement of a subject reflecting the transmission wave.

The plurality of reception antenna arrays is arranged in different orientations from one another.

The signal processor synthesizes the displacement of the subject detected by each of the plurality of reception antenna arrays.

In one embodiment, a method for controlling an electronic device includes transmission, reception, detection, and synthesis.

The transmission transmits a transmission wave from a transmission antenna.

The reception receives a reflected wave, the reflected wave being the transmission wave having been reflected, via a plurality of reception antenna arrays each including a plurality of reception antennas, the plurality of reception antenna arrays being arranged in different orientations from one another.

The detection detects, based on a transmission signal transmitted as the transmission wave and a reception signal received as the reflected wave, displacement of a subject reflecting the transmission wave.

The synthesis synthesizes the displacement of the subject detected by each of the plurality of reception antenna arrays.

In one embodiment, a program causes an electronic device to execute transmission, reception, detection, and synthesis.

The transmission transmits a transmission wave from a transmission antenna.

The reception receives a reflected wave, the reflected wave being the transmission wave having been reflected, via a plurality of reception antenna arrays each including a plurality of reception antennas, the plurality of reception antenna arrays being arranged in different orientations from one another.

The detection detects, based on a transmission signal transmitted as the transmission wave and a reception signal received as the reflected wave, displacement of a subject reflecting the transmission wave.

The synthesis synthesizes the displacement of the subject detected by each of the plurality of reception antenna arrays.

DESCRIPTION OF EMBODIMENTS

Figure 1:
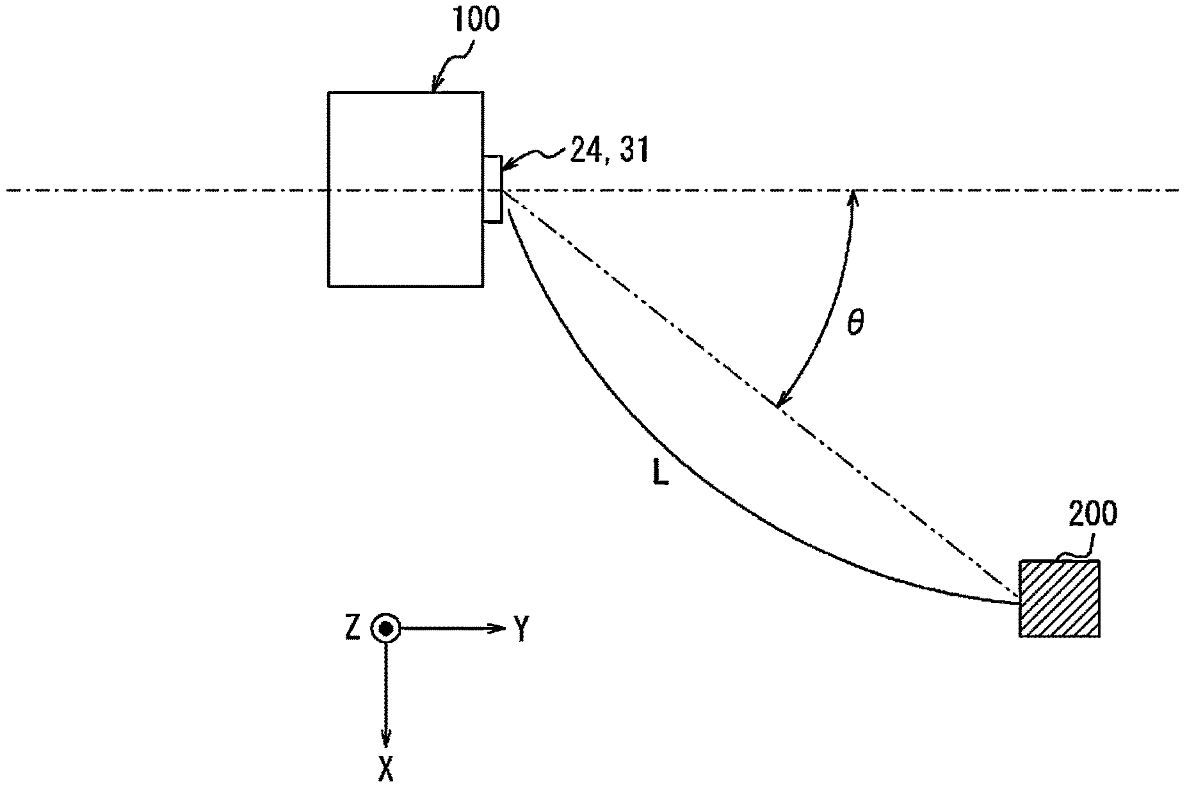
FIG. 1 is a diagram for explaining how an electronic device 100 according to one embodiment is used.

Usefulness in various fields can be expected if oscillations such as vibrations of an apparatus or a heartbeat in a human body or the like can be detected with good accuracy through transmission and reception of a radio wave or the like such as, for example, a millimeter wave. The present disclosure provides an electronic device capable of detecting the displacement of a subject with good accuracy through transmission and reception of a radio wave or the like, a method for controlling an electronic device, and a program. One embodiment makes it possible to provide an electronic device capable of detecting the displacement of a subject with good accuracy through transmission and reception of a radio wave or the like, a method for controlling an electronic device, and a program. One embodiment will now be described in detail with reference to the drawings.

In the present disclosure, the term "electronic device" may refer to a device driven by electric power. The term "user" may refer to an entity (typically, a human) using, or an animal using, a system and/or an electronic device according to one embodiment. The user may include an entity who monitors a subject such as a human by using the electronic device according to one embodiment. The term "subject" may refer to an object or a living entity (for example, a human or an animal) to be monitored with the electronic device according to one embodiment. The user may be included in the subject. The object may be an engine, a machine tool, a lathe machine, a processing machine, conveyance such as an automobile, etc., but is not limited to them. The object may be any other kind of apparatus.

The electronic device according to one embodiment may detect the displacement of an apparatus as the target of detection. The displacement may include, for example, vibrations of an apparatus. The displacement may include displacement of any combination of periodic motion, non-periodic motion, and/or random motion, etc. Accordingly, expected scenes where the electronic device according to one embodiment will be used are, for example, a factory, a work site, a parking lot, or the like. The electronic device according to one embodiment may detect a vibration velocity of an apparatus as the target of detection, where the vibration velocity is calculated from the displacement of the apparatus per predetermined time. In this case, the electronic device according to one embodiment may detect the vibration velocity in place of the displacement or in addition to the displacement.

The electronic device according to one embodiment is capable of detecting a heartbeat of a subject such as a human located in the neighborhood of the electronic device. Accordingly, expected scenes where the electronic device according to one embodiment will be used may be specific facilities used by entities who perform social activities, such as, for example, a company, a hospital, a nursing home, a school, a gym, and a care facility. For example, in the case of a company, grasping and/or managing health conditions of employees and the like are very important. Likewise, in the case of a hospital, grasping and/or managing health conditions of patients, healthcare workers, and the like are very important. In the case of a nursing home, grasping and/or managing health conditions of residents, staff members, and the like are very important. The scenes where the electronic device according to one embodiment will be used are not limited to the above-mentioned facilities such as a company, a hospital, and a nursing home, but may be any facility where grasping and/or managing health conditions of a subject are demanded. "Any facility" may include non-commercial facilities such as a house of a user. The scenes where the electronic device according to one embodiment is used are not limited to indoor places, but may be outdoor places. For example, the scenes where the electronic device according to one embodiment will be used may be the inside of mobility means such as a train, a bus, and an airplane, a station, a landing, and the like. The electronic device according to one embodiment may be used aboard mobility means such as an automobile, an aircraft, or a vessel, at a hotel, at a house of a user, in a living room of the user's house, a bathroom thereof, a lavatory thereof, a bedroom thereof, or the like.

For example, the electronic device according to one embodiment may be used for the purpose of detecting or monitoring a heartbeat of a subject such as a person requiring medical care or a person requiring nursing care at a care facility or the like. Upon finding something abnormal in the heartbeat of the subject such as a person requiring medical care or a person requiring nursing care, for example, the electronic device according to one embodiment may issue a predetermined warning to, for example, the subject himself/herself and/or another person. Thus, the electronic device according to one embodiment enables the subject such as, for example, a person requiring medical care or a person requiring nursing care, and/or a staff member at a care facility or the like, to grasp the abnormality in the pulse of the subject. Upon finding nothing abnormal in the heartbeat of the subject such as a person requiring medical care or a person requiring nursing care, for example, the electronic device according to one embodiment may inform, for example, the subject himself/herself and/or another person that no abnormality is found in the heartbeat. Thus, the electronic device according to one embodiment enables the subject such as, for example, a person requiring medical care or a person requiring nursing care, and/or a staff member at a care facility or the like, to grasp that the pulse of the subject is normal (or not abnormal).

The electronic device according to one embodiment may detect the pulse of a subject other than a human, such as an animal. The description will be given below on an assumption that the electronic device according to one embodiment detects the pulse of a human by means of a sensor based on a technology such as a millimeter-wave radar, for example. The target of detection by the electronic device according to one embodiment may include biological information about cardiac motion such as a heartbeat, throbbing, pulsation, pulsing motion, and the like of a human and a living entity other than a human such as an animal. The target of detection by the electronic device according to one embodiment may include a bodily movement of a human and a living entity other than a human such as an animal.

The electronic device according to one embodiment may be installed in or on any stationary object or may be installed in or on any mobility device. The electronic device according to one embodiment is capable of transmitting a transmission wave to an area around the electronic device from a transmission antenna. The electronic device according to one embodiment is capable of receiving, by means of a reception antenna, a reflected wave that is the transmission wave having been reflected. The electronic device may include at least one of the transmission antenna or the reception antenna. Alternatively, for example, a radar sensor or the like may include at least one of the transmission antenna or the reception antenna.

In the description given below, as a typical example, the electronic device according to one embodiment is assumed to be stationary. On the other hand, a subject (a human) whose pulse is to be detected by the electronic device according to one embodiment may be stationary, may be moving, or may be moving his/her body while being stationary. As is the case with an ordinary radar sensor, the electronic device according to one embodiment is capable of measuring a distance, etc. between the electronic device and an object located in the neighborhood of the electronic device when the object is movable. The electronic device according to one embodiment is capable of measuring a distance, etc. between the electronic device and the object even if both the electronic device and the object are stationary.

As will be described later, an electronic device 1 according to one embodiment includes at least one transmission antenna array and a plurality of reception antenna arrays. First, as a preamble before giving an explanation of an operation principle of the electronic device 1 according to one embodiment, an electronic device 100 that can be configured as a part of the electronic device 1 according to one embodiment will now be described while referring to the drawings. The electronic device 100 disclosing a partial configuration of the electronic device 1 according to one embodiment will be simply referred to as "electronic device 100". That is, the electronic device 100 described below may have a configuration obtained by deleting or omitting some functional units and/or parts from a configuration of the electronic device 1 according to one embodiment.

First, an example of detecting vibrations of an object by the electronic device 100 according to one embodiment will now be described. Described below is a case where the electronic device 100 according to one embodiment detects vibrations of an engine, a machine tool, a lathe machine, a processing machine or any other kind of apparatus, or conveyance such as an automobile, etc.

FIG. 1 is a diagram for explaining an example of how the electronic device 100 according to one embodiment is used. FIG. 1 illustrates an example of the electronic device 100 according to one embodiment that has functions of a sensor including a transmission antenna and a reception antenna.

As illustrated in FIG. 1, the electronic device 100 may include a transmission unit and a reception unit that will be described later. As will be described later, the transmission unit may include a transmission antenna array 24. The reception unit may include a reception antenna array 31. Specific configurations of the electronic device 100, the transmission unit, and the reception unit will be described later. FIG. 1 illustrates a circumstance in which, for easier view, the electronic device 100 includes the transmission antenna array 24 and the reception antenna array 31. The electronic device 100 may include, as appropriate, at least any of other functionalities, such as at least a part of a signal processing unit 10 (FIG. 2) included in the electronic device 100. The electronic device 100 may be configured such that at least any of other functionalities, such as at least a part of the signal processing unit 10 (FIG. 2) included in the electronic device 100, is provided outside the electronic device 100. In FIG. 1, the electronic device 100 may be moving, or be stationary without moving.

The example illustrated in FIG. 1 gives a simplified view of the transmission unit including the transmission antenna array 24 and the reception unit including the reception antenna array 31 of the electronic device 100. The electronic device 100 may include a plurality of transmission units and a plurality of reception units. The transmission unit may include the transmission antenna array 24 made up of a plurality of transmission antennas. The reception unit may include the reception antenna array 31 made up of a plurality of reception antennas. A position where the transmission unit and/or the reception unit is/are installed in or on the electronic device 100 is not limited to the position illustrated in FIG. 1 but may be any other position. The number of transmission units and/or the number of reception units may be any number equal to or greater than one, depending on various conditions (or requirements) such as a heartbeat detection range and/or a heartbeat detection accuracy to be achieved by the electronic device 100.

As will be described later, the electronic device 100 transmits an electromagnetic wave as a transmission wave from the transmission antenna array 24. For example, when a predetermined object entity (for example, a target device 200 illustrated in FIG. 1) is located in the neighborhood of the electronic device 100, at least a part of the transmission wave transmitted from the electronic device 100 is reflected off the object entity to turn into a reflected wave. Then, for example, the reception antenna array 31 of the electronic device 100 receives such a reflected wave. By this means, the electronic device 100 can detect the subject as a target.

The electronic device 100 including the transmission antenna array 24 may be typically a radar (Radio Detecting and Ranging) sensor configured to transmit and receive a radio wave. However, the electronic device 100 is not limited to a radar sensor. The electronic device 100 according to one embodiment may be, for example, a sensor based on the LIDAR (Light Detection and Ranging, Laser Imaging Detection and Ranging) technology that uses an optical wave. These sensors can include, for example, patch antennas, etc. Since the RADAR and the LIDAR are known technologies, detailed description thereof will be sometimes omitted, or the description thereof will be sometimes simplified, where appropriate. The electronic device 100 according to one embodiment may be a sensor that is based on a technology of detecting an object entity by transmitting and receiving a sound wave or an ultrasound wave, for example.

The electronic device 100 illustrated in FIG. 1 receives, via the reception antenna array 31, the reflected wave coming back due to reflection of the transmission wave transmitted from the transmission antenna array 24. In this way, the electronic device 100 can detect, as the target, the predetermined target device 200 located within a predetermined distance from the electronic device 100. For example, as illustrated in FIG. 1, the electronic device 100 is capable of measuring a distance L between the electronic device 100 and the predetermined target device 200. The electronic device 100 is capable of measuring a relative velocity between the electronic device 100 and the predetermined target device 200. The electronic device 100 is capable of measuring a direction (an angle of arrival θ) in which the reflected wave coming from the predetermined target device 200 arrives at the electronic device 100.

In FIG. 1, an XY plane may be, for example, a plane substantially parallel to a ground surface. In this case, a positive Z-axis direction illustrated in FIG. 1 may indicate a vertically upward direction. In FIG. 1, the electronic device 100 may be disposed on a plane parallel to the XY plane. In FIG. 1, the target device 200 may be in a state of, for example, standing on the ground surface substantially parallel to the XY plane.

The target device 200 may be, for example, an apparatus or the like located in the neighborhood of the electronic device 100. As described above, the target device 200 may be moving, stopped, or stationary. The target device 200 may include an engine, a machine tool, a lathe machine, a processing machine or any other kind of apparatus, conveyance such as an automobile, etc. The electronic device 100 according to the present embodiment may detect vibrations of any kind of apparatus such as an engine, a machine tool, a lathe machine, and/or a processing machine. The target device 200 may be installed at a factory, production facilities, a laboratory, or the like.

In the present disclosure, an object entity to be detected by the electronic device 100 includes living things such as a person, a dog, a cat, a horse, and other kinds of animal in addition to non-living things such as any object. The object entity to be detected by the electronic device 100 in the present disclosure may include a radar target including a person, an object, and an animal, etc. to be detected using the radar technology. In the description given below, an object entity such as the target device 200 located in the neighborhood of the electronic device 100 is assumed to be an apparatus.

In FIG. 1, a ratio between a size of the electronic device 100 and a size of the target device 200 does not necessarily indicate an actual ratio. FIG. 1 illustrates a state in which the transmission antenna array 24 of the transmission unit and the reception antenna array 31 of the reception unit are installed on an outer portion of the electronic device 100. However, in one embodiment, the transmission antenna array 24 of the transmission unit and/or the reception antenna array 31 of the reception unit may be installed at various positions of the electronic device 100. For example, in one embodiment, the transmission antenna array 24 of the transmission unit and/or the reception antenna array 31 of the reception unit may be installed inside the electronic device 100 so as not to appear on the exterior of the electronic device 100.

In the description given below, as a typical example, the transmission antenna of the electronic device 100 is assumed to transmit a radio wave in a frequency band, such as a millimeter wave (equal to or higher than 30 GHz) or a quasi-millimeter wave (for example, around 20 GHz to 30 GHz). On the other hand, the transmission antenna of the electronic device 100 may transmit a radio wave having a frequency bandwidth of 4 GHz such as, for example, from 77 GHz to 81 GHz.

Figure 2:
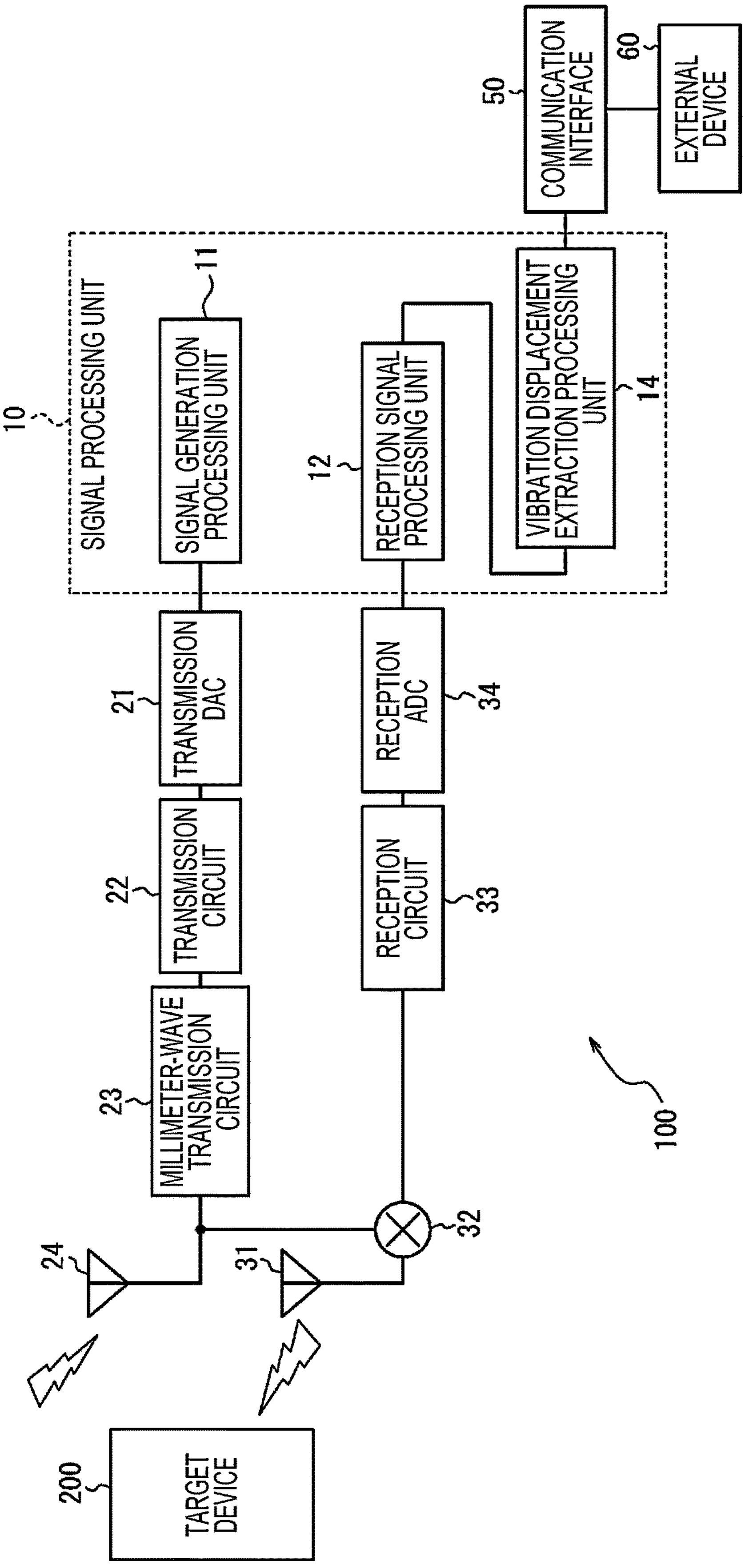
FIG. 2 is a block diagram schematically illustrating a configuration of the electronic device 100 according to one embodiment.

FIG. 2 is a functional block diagram schematically illustrating an example of a configuration of the electronic device 100 according to one embodiment. An example of the configuration of the electronic device 100 according to one embodiment will be described below.

When a distance or the like is measured by using a millimeter-wave radar, a frequency modulated continuous wave radar (hereinafter abbreviated as "FM-CW radar") is often used. The FM-CW radar sweeps a frequency of a to-be-transmitted radio wave to generate a transmission signal. Therefore, the frequency of a radio wave used by, for example, a 79-GHz millimeter-wave FM-CW radar has a frequency bandwidth of 4 GHz such as from, for example, 77 GHz to 81 GHz. The radar in the frequency band of 79 GHz has a feature of a wider usable frequency bandwidth, as compared with other millimeter-wave/quasi-millimeter-wave radars in frequency bands of, for example, 24 GHz, 60 GHz, 76 GHz, and the like. Such an embodiment will be described below as an example.

The FM-CW radar scheme used in the present disclosure may include an FCM (Fast-Chirp Modulation) scheme, in which chirp signals are transmitted in a shorter cycle than usual. The signal generated by the electronic device 100 is not limited to a signal of the FM-CW scheme. The signal generated by the electronic device 100 may be a signal of various schemes other than the FM-CW scheme. A transmission signal sequence stored in any storage unit may differ from one to another of these various schemes. For example, in the case of a radar signal of the FM-CW scheme described above, a signal whose frequency increases/decreases for each time sample may be used. A more detailed description of the various schemes described above is omitted because known techniques can be employed as appropriate.

As illustrated in FIG. 2, the electronic device 100 according to one embodiment includes the signal processing unit 10. The signal processing unit 10 may include a signal generation processing unit 11, a reception signal processing unit 12, and a vibration displacement extraction processing unit 14. The signal generation processing unit 11 may perform processing regarding the generation of a transmission signal. The reception signal processing unit 12 may perform processing regarding, for example, a reception signal received as a reflected wave coming back due to reflection of a transmission signal transmitted by the signal generation processing unit 11. Specifically, the reception signal processing unit 12 may measure (estimate) at least one of a distance to the target device 200, a relative velocity in relation to the target device 200, an angle of azimuth of the target device 200, or the like. The vibration displacement extraction processing unit 14 may perform processing regarding the extraction of displacement of vibration.

The reception signal processing unit 12 and/or the vibration displacement extraction processing unit 14 may perform processing of, for example, extracting micro-Doppler components. The reception signal processing unit 12 and/or the vibration displacement extraction processing unit 14 may perform processing of extracting an envelope of vibrations of the target device 200. Based on a frequency analysis of time-series data of vibrations, the reception signal processing unit 12 and/or the vibration displacement extraction processing unit 14 may perform processing of calculating changes in vibrations of the target device 200.

When the target of detection by the electronic device in the present disclosure is a living entity, the reception signal processing unit 12 and/or the vibration displacement extraction processing unit 14 may perform processing of, for example, extracting micro-Doppler components. When the target of detection by the electronic device in the present disclosure is a living entity, the reception signal processing unit 12 and/or the vibration displacement extraction processing unit 14 may perform processing of extracting an envelope of cardiac sound of the subject. When the target of detection by the electronic device in the present disclosure is a living entity, the reception signal processing unit 12 and/or the vibration displacement extraction processing unit 14 may perform processing of, for example, extracting a heart rate interval (RRI) of the subject. When the target of detection by the electronic device in the present disclosure is a living entity, the reception signal processing unit 12 and/or the vibration displacement extraction processing unit 14 may perform processing for frequency analysis of time-series data of the extracted heart rate interval of the subject. When the target of detection by the electronic device in the present disclosure is a living entity, the reception signal processing unit 12 and/or the vibration displacement extraction processing unit 14 may perform processing of calculating a heart rate variability of the subject on the basis of the frequency analysis of the time-series data of the heart rate interval.

As illustrated in FIG. 2, the electronic device 100 according to one embodiment includes, as the transmission unit, a transmission DAC 21, a transmission circuit 22, a millimeter-wave transmission circuit 23, and the transmission antenna array 24. The electronic device 100 according to one embodiment includes, as the reception unit, the reception antenna array 31, a mixer 32, a reception circuit 33, and a reception ADC 34. The electronic device 100 according to one embodiment may be configured not to include at least any of the functional units illustrated in FIG. 2 or may include a functional unit(s) other than the functional units illustrated in FIG. 2. The electronic device 100 illustrated in FIG. 2 may be configured using a circuit that has a configuration that is basically the same as or similar to that of an ordinary radar using an electromagnetic wave such as a millimeter-band wave. On the other hand, in the electronic device 100 according to one embodiment, signal processing performed by the signal processing unit 10 may include processing different from that of an ordinary radar of related art.

The signal processing unit 10 of the electronic device 100 according to one embodiment is capable of performing control on the overall operation of the electronic device 100, besides control on each functional unit of the electronic device 100. Among them, the signal processing unit 10 performs various kinds of processing on signals dealt with by the electronic device 100. To provide control and processing capabilities for executing various functions, the signal processing unit 10 may include at least one processor such as, for example, a CPU (Central Processing Unit) or a DSP (Digital Signal Processor). The signal processing unit 10 may be collectively embodied by one processor, may be embodied by some processors, or may be embodied by discrete individual processors. The processor may be embodied as a single integrated circuit. The integrated circuit is also referred to as "IC". The processor may be embodied as a plurality of integrated circuits and discrete circuits connected communicably. The processor may be embodied based on various other known technologies. In one embodiment, the signal processing unit 10 may be configured as, for example, a CPU(s) (hardware) and a program(s) (software) run by the CPU. The signal processing unit 10 may include, as appropriate, a storage unit (memory) necessary for operation of the signal processing unit 10.

The signal generation processing unit 11 of the signal processing unit 10 generates a signal to be transmitted from the electronic device 100. In the electronic device 100 according to one embodiment, the signal generation processing unit 11 may generate a transmission signal such as, for example, a chirp signal (transmission chirp signal). In particular, the signal generation processing unit 11 may generate a signal (linear chirp signal) whose frequency changes linearly in a periodic manner. For example, the signal generation processing unit 11 may generate a chirp signal whose frequency increases linearly in a periodic manner from 77 GHz to 81 GHz as time elapses. For example, the signal generation processing unit 11 may generate a signal whose frequency repeats a linear increase (up-chirp) from 77 GHz to 81 GHz and a decrease (down-chirp) in a periodic manner as time elapses. For example, the signal generated by the signal generation processing unit 11 may be preset at the signal processing unit 10. For example, the signal generated by the signal generation processing unit 11 may be pre-stored in any storage unit or the like of the signal processing unit 10. Since a chirp signal used in a technical field of a radar and the like is known, detailed description thereof will be omitted, or the description thereof will be simplified, where appropriate. The signal generated by the signal generation processing unit 11 is supplied to the transmission DAC 21. Therefore, the signal generation processing unit 11 may be connected to the transmission DAC 21.

The transmission DAC (digital-to-analog converter) 21 has a function of converting a digital signal supplied from the signal generation processing unit 11 into an analog signal. The transmission DAC 21 may include an ordinary digital-to-analog converter. The signal having been converted into an analog format by the transmission DAC 21 is supplied to the transmission circuit 22. Therefore, the transmission DAC 21 may be connected to the transmission circuit 22.

The transmission circuit 22 has a function of converting the signal having been converted into the analog format by the transmission DAC 21 into a signal of an intermediate frequency (IF) band. The transmission circuit 22 may include an ordinary IF-band transmission circuit. The signal having been processed by the transmission circuit 22 is supplied to the millimeter-wave transmission circuit 23. Therefore, the transmission circuit 22 may be connected to the millimeter-wave transmission circuit 23.

The millimeter-wave transmission circuit 23 has a function of transmitting, as a millimeter wave (RF wave), the signal having been processed by the transmission circuit 22. The millimeter-wave transmission circuit 23 may include an ordinary millimeter-wave transmission circuit. The signal having been processed by the millimeter-wave transmission circuit 23 is supplied to the transmission antenna array 24. Therefore, the millimeter-wave transmission circuit 23 may be connected to the transmission antenna array 24. The signal having been processed by the millimeter-wave transmission circuit 23 is supplied to the mixer 32, too. Therefore, the millimeter-wave transmission circuit 23 may be connected to the mixer 32, too.

The transmission antenna array 24 is an array of the plurality of transmission antennas. In FIG. 2, the configuration of the transmission antenna array 24 is simplified. The transmission antenna array 24 transmits the signal having been processed by the millimeter-wave transmission circuit 23 to the outside of the electronic device 100. The transmission antenna array 24 may include a transmission antenna array used in an ordinary millimeter-wave radar.

As described above, the electronic device 100 according to one embodiment includes a transmission antenna (the transmission antenna array 24) and is capable of transmitting a transmission signal (for example, a transmission chirp signal) as a transmission wave from the transmission antenna array 24.

Suppose that, for example, as illustrated in FIG. 2, an object entity such as the target device 200 is located in the neighborhood of the electronic device 100. In this case, the object entity such as the target device 200 reflects at least a part of a transmission wave transmitted from the transmission antenna array 24. At least a part of the transmission wave transmitted from the transmission antenna array 24, the part being reflected off the object entity such as the target device 200, can come back toward the reception antenna array 31.

The reception antenna array 31 receives the reflected wave. The reflected wave mentioned here may be at least a part of a reflection, of the transmission wave transmitted from the transmission antenna array 24, reflected off the object entity such as the target device 200.

The reception antenna array 31 is an array of the plurality of reception antennas. In FIG. 2, the configuration of the reception antenna array 31 is simplified. The reception antenna array 31 receives the reflected wave coming back due to reflection of the transmission wave transmitted from the transmission antenna array 24. The reception antenna array 31 may include a reception antenna array used in an ordinary millimeter-wave radar. The reception antenna array 31 supplies the reception signal received as the reflected wave to the mixer 32. Therefore, the reception antenna array 31 may be connected to the mixer 32.

The mixer 32 performs conversion, into an intermediate frequency (IF) band, of the signal (transmission signal) having been processed by the millimeter-wave transmission circuit 23 and the reception signal having been received by the reception antenna array 31. The mixer 32 may include a mixer used in an ordinary millimeter-wave radar. The mixer 32 supplies a signal generated as a result of mixing to the reception circuit 33. Therefore, the mixer 32 may be connected to the reception circuit 33.

The reception circuit 33 has a function of performing analog processing on the signal having been converted into the IF band by the mixer 32. The reception circuit 33 may include a reception circuit compliant with ordinary IF-band conversion. The signal having been processed by the reception circuit 33 is supplied to the reception ADC 34. Therefore, the reception circuit 33 may be connected to the reception ADC 34.

The reception ADC (analog-to-digital converter) 34 has a function of converting an analog signal supplied from the reception circuit 33 into a digital signal. The reception ADC 34 may include an ordinary analog-to-digital converter. The signal having been digitized by the reception ADC 34 is supplied to the reception signal processing unit 12 of the signal processing unit 10. Therefore, the reception ADC 34 may be connected to the signal processing unit 10.

The reception signal processing unit 12 of the signal processing unit 10 has a function of performing various kinds of processing on the digital signal supplied from the reception DAC 34. For example, based on the digital signal supplied from the reception DAC 34, the reception signal processing unit 12 calculates the distance from the electronic device 100 to the object entity such as the target device 200 (range measurement). Based on the digital signal supplied from the reception DAC 34, the reception signal processing unit 12 calculates the relative velocity of the object entity such as the target device 200 in relation to the electronic device 100 (velocity measurement). Based on the digital signal supplied from the reception DAC 34, the reception signal processing unit 12 calculates the angle of azimuth, as viewed from the electronic device 100, of the object entity such as the target device 200 (angle measurement). Specifically, the reception signal processing unit 12 may receive an input of I/Q-converted data. Upon receiving an input of this kind of data, the reception signal processing unit 12 performs fast Fourier transform in each of a distance (range) direction and a speed (velocity) direction (2D-FFT). After that, the reception signal processing unit 12 may perform processing of, for example, CFAR (Constant False Alarm Rate) to remove noise points, thereby suppressing false alarms and making probabilities constant. Then, the reception signal processing unit 12 may perform angle-of-arrival estimation on points satisfying the CFAR criterion to obtain the position of the object entity such as the target device 200. Information generated as the results of range measurement, velocity measurement, and angle measurement performed by the reception signal processing unit 12 may be supplied to the vibration displacement extraction processing unit 14.

The vibration displacement extraction processing unit 14 extracts displacement of vibration as information regarding a heartbeat from the information having been generated by the reception signal processing unit 12. A more detailed description will be given later about operation of extracting the information regarding a heartbeat by the vibration displacement extraction processing unit 14. The information regarding a heartbeat having been extracted by the vibration displacement extraction processing unit 14 may be supplied to a communication interface 50. Therefore, the vibration displacement extraction processing unit 14 and/or the signal processing unit 10 may be connected to the communication interface 50. Various kinds of information having been processed by the vibration displacement extraction processing unit 14 may be supplied to any functional unit other than the communication interface 50.

The communication interface 50 may include an electric interface configured to output, for example, to an external device 60 or the like, the information supplied from the signal processing unit 10. The communication interface 50 may output, to the external device 60 or the like, information on at least any of the position, velocity, and angle of the object entity such as the target device 200 as, for example, a signal of CAN (Controller Area Network), UART (Universal Asynchronous Receiver Transmitter), or the like. For example, the information on at least any of the position, velocity, and angle of the object entity such as the target device 200 may be supplied via the communication interface 50 to the external device 60 or the like. Therefore, the communication interface 50 may be connected to the external device 60 or the like.

As illustrated in FIG. 2, the electronic device 100 according to one embodiment may be connected to the external device 60 via the communication interface 50 through at least one of wired connection or wireless connection. In one embodiment, the external device 60 may include any computer and/or any control device, etc. The electronic device 100 according to one embodiment may include the external device 60. Various kinds of configuration can be adopted for the external device 60, in accordance with how the information on vibrations, a heartbeat, and/or cardiac sound detected by the electronic device 100 is used. Therefore, a more detailed description of the external device 60 is not given here.

Figure 3:
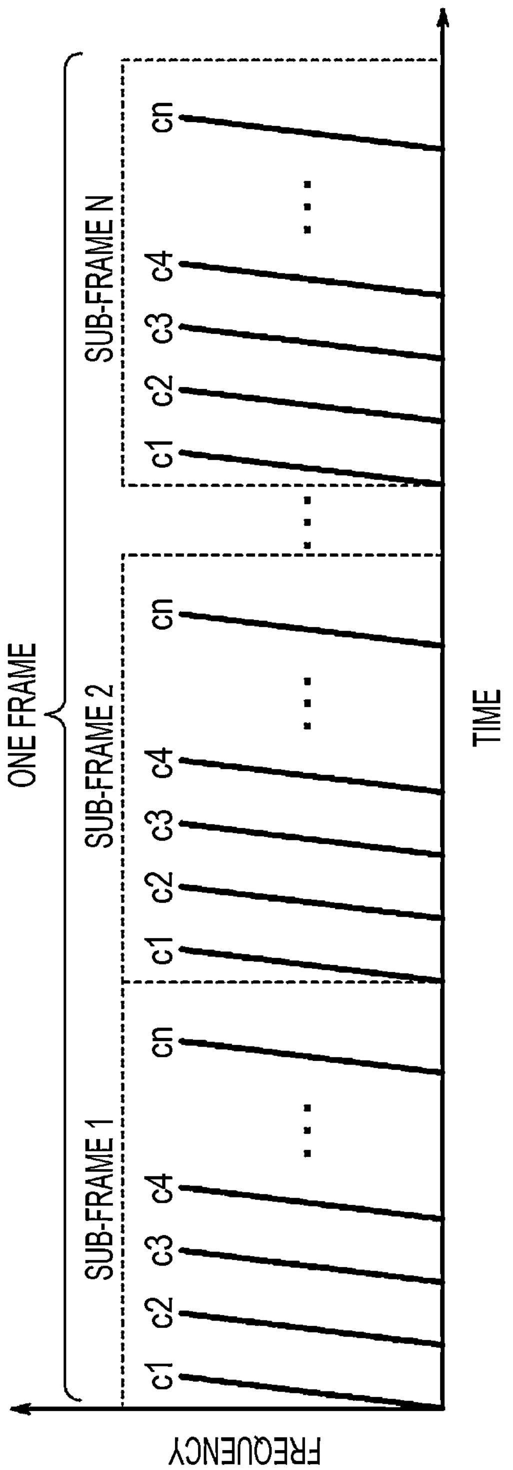
FIG. 3 is a diagram for explaining a configuration of a signal processed by the electronic device 100 according to one embodiment.

FIG. 3 is a diagram for explaining an example of chirp signals generated by the signal generation processing unit 11 of the signal processing unit 10.

FIG. 3 illustrates a structure of one frame with respect to time when an FCM (Fast-Chirp Modulation) scheme is used. FIG. 3 illustrates an example of a reception signal conforming to the FCM scheme. The FCM is a scheme in which chirp signals denoted by c1, c2, c3, c4, . . . , cn in FIG. 3 are repeated at short intervals (equal to or greater than a round-trip time of an electromagnetic wave between the radar and the radar target, calculated from, for example, the maximum ranging distance). In the FCM, for convenience of signal processing of a reception signal, transmission/reception processing is often performed with division in unit of sub-frames such as those illustrated in FIG. 3.

In FIG. 3, the horizontal axis represents elapsed time and the vertical axis represents frequency. In the example illustrated in FIG. 3, the signal generation processing unit 11 generates linear chirp signals whose frequency changes linearly in a periodic manner. In FIG. 3, the individual chirp signals are denoted by c1, c2, c3, c4, . . . , cn. As illustrated in FIG. 3, the frequency of each chirp signal increases linearly as time elapses.

In the example illustrated in FIG. 3, one sub-frame includes several chirp signals c1, c2, c3, c4, . . . , cn. That is, each of sub-frames such as a sub-frame 1 and a sub-frame 2 illustrated in FIG. 3 includes several chirp signals c1, c2, c3, c4, . . . , cn. In the example illustrated in FIG. 3, one frame (each single frame) includes several sub-frames such as the sub-frames 1, 2, . . . , N. That is, one frame illustrated in FIG. 3 includes N sub-frames. The one frame illustrated in FIG. 3 may serve as a frame 1, which may be followed by a frame 2, a frame 3, and so on. Similarly to the frame 1, each of these frames may include N sub-frames. A frame interval of a predetermined length may be included between frames. One frame illustrated in FIG. 3 may have a length of approximately 30 ms to 50 ms, for example.

In the electronic device 100 according to one embodiment, the signal generation processing unit 11 may generate a transmission signal as any number of frames. In FIG. 3, illustration of a part of chirp signals is omitted. A relationship between time and frequency of a transmission signal generated by the signal generation processing unit 11 as described above may be stored in, for example, the storage unit or the like of the signal processing unit 10.

As described above, the electronic device 100 according to one embodiment may transmit a transmission signal constituted by sub-frames each including a plurality of chirp signals. The electronic device 100 according to one embodiment may transmit a transmission signal constituted by frames each including a predetermined number of sub-frames.

In the description given below, the electronic device 100 is assumed to transmit a transmission signal having a frame structure illustrated in FIG. 3. However, the frame structure illustrated in FIG. 3 is just an example. For example, any number of chirp signals may be included in one sub-frame. That is, in one embodiment, the signal generation processing unit 11 may generate a sub-frame including any number (for example, any plural number) of chirp signals. The sub-frame structure illustrated in FIG. 3 is also just an example. For example, the sub-frames included in one frame may have any structure. That is, in one embodiment, the signal generation processing unit 11 may generate a frame including any number (for example, any plural number) of sub-frames. The signal generation processing unit 11 may generate signals having different frequencies. The signal generation processing unit 11 may generate a plurality of discrete signals having bandwidths in which frequencies f are different from each other.

Figure 4:
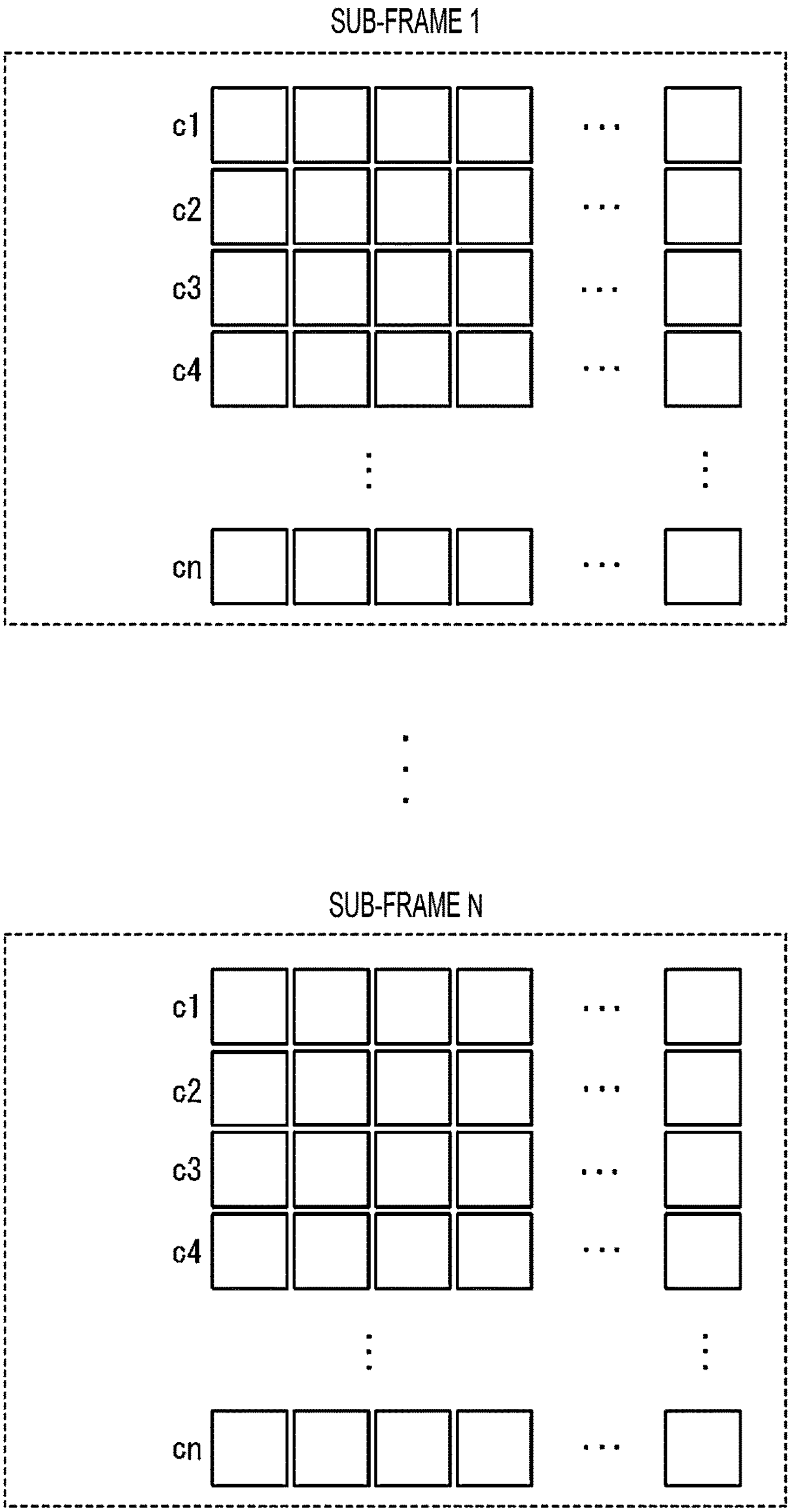
FIG. 4 is a diagram for explaining processing of a signal by the electronic device 100 according to one embodiment.

FIG. 4 is a diagram illustrating a part of the sub-frames of FIG. 3 in a different manner. FIG. 4 illustrates each sample of a reception signal obtained as a result of performing two-dimensional fast Fourier transform (2D-FFT), which is processing performed at the reception signal processing unit 12 of the signal processing unit 10 (FIG. 2) when the transmission signal illustrated in FIG. 3 is received.

As illustrated in FIG. 4, the chirp signals c1, c2, c3, c4, . . . , cn are stored in each sub-frame such as the sub-frame 1, . . . , sub-frame N. In FIG. 4, each of the chirp signals c1, c2, c3, c4, . . . , cn consists of samples represented by a row of squares arranged in a horizontal direction. The reception signal illustrated in FIG. 4 is subjected to 2D-FFT, CFAR, and/or integrated signal processing for each sub-frame, etc. by the reception signal processing unit 12 illustrated in FIG. 2.

Figure 5:
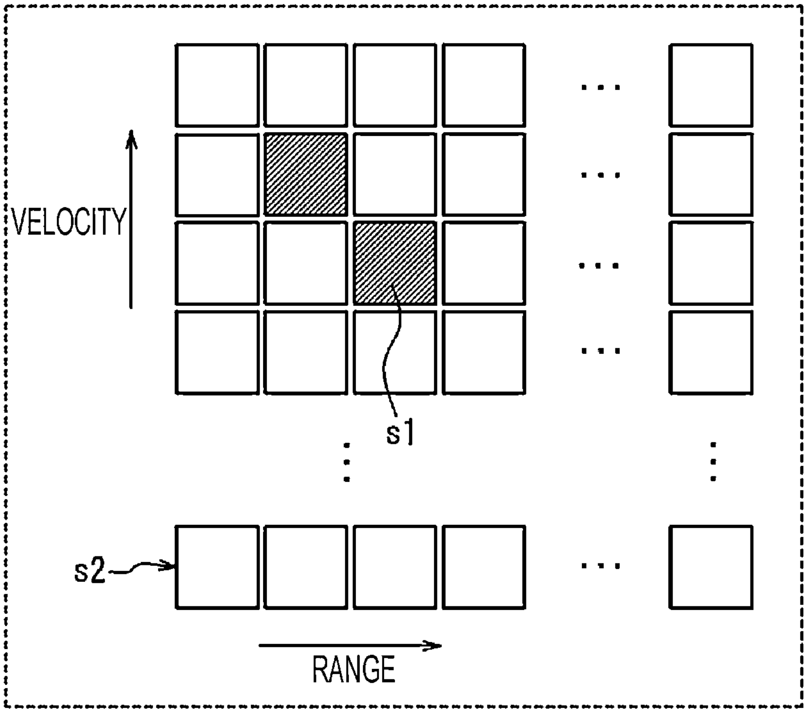
FIG. 5 is a diagram for explaining processing of a signal by the electronic device 100 according to one embodiment.

FIG. 5 is a diagram illustrating an example in which a point group on a range-Doppler (distance-velocity) plane is calculated as a result of performing 2D-FFT, CFAR, and integrated signal processing of the sub-frames at the reception signal processing unit 12 illustrated in FIG. 2.

In FIG. 5, the horizontal direction represents range (distance) and the vertical direction represents velocity. A shaded square s1 illustrated in FIG. 5 denotes a point group representing a signal exceeding the threshold of CFAR. An unshaded square s2 illustrated in FIG. 5 denotes a bin (2D-FFT sample) without a point group, not exceeding the threshold of CFAR. For a point group on the range-Doppler plane calculated in FIG. 5, the direction from the radar is calculated by performing direction estimation, and the position and velocity on a two-dimensional plane are calculated as a point group representing the object entity such as the target device 200. The direction estimation mentioned here may be calculated using a beam former and/or a subspace method. Typical algorithms for the subspace method are: MUSIC (multiple signal classification), ESPRIT (estimation of signal parameters via rotation invariance technique), and the like.

Figure 6:
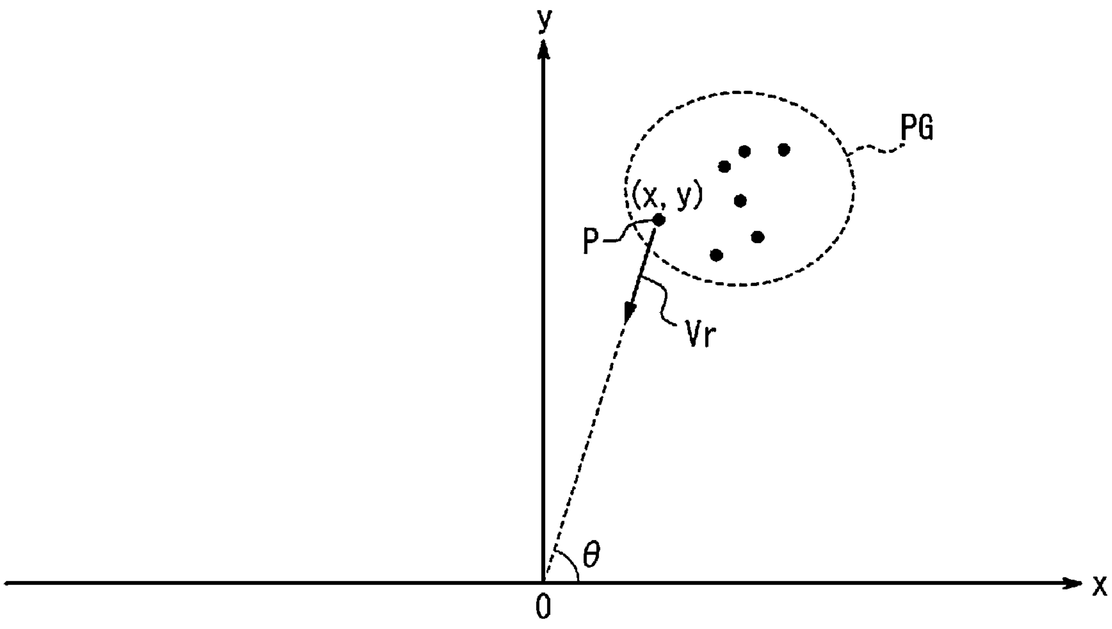
FIG. 6 is a diagram for explaining processing of a signal by the electronic device 100 according to one embodiment.

FIG. 6 illustrates an example of results obtained by transforming point group coordinates from the range-Doppler plane illustrated in FIG. 5 to the XY plane after performing the direction estimation by the reception signal processing unit 12. As illustrated in FIG. 6, the reception signal processing unit 12 is capable of plotting a point group PG on the XY plane. The point group PG is made up of individual points P. Each point P has an angle θ and a velocity Vr in a radial direction in polar coordinates.

Based on at least one of the result of 2D-FFT estimation or the result of angle estimation, the reception signal processing unit 12 detects an object entity located in a range in which a transmission wave T is transmitted. The reception signal processing unit 12 may perform object detection by performing, for example, clustering processing on the basis of each estimated distance information, velocity information, and angle information. A known example of algorithms used for data clustering is DBSCAN (density-based spatial clustering of applications with noise). This is an algorithm for performing density-based clustering. In the clustering processing, for example, average power of points constituting the object entity to be detected may be calculated. The distance information, the velocity information, the angle information, and the power information regarding the object entity detected by the reception signal processing unit 12 may be supplied to, for example, the external device 60, etc. via the communication interface 50.

As described above, the electronic device 100 may include transmission antennas (the transmission antenna array 24), reception antennas (the reception antenna array 31), and the signal processing unit 10. The transmission antenna array 24 transmits a transmission wave T. The reception antenna array 31 receives a reflected wave R that is the transmission wave T having been reflected. Then, based on a transmission signal transmitted as the transmission wave T and a reception signal received as the reflected wave R, the signal processing unit 10 detects an object entity (for example, an object such as the target device 200) that reflects the transmission wave T.

A further explanation will now be given of estimating the direction of an arrival wave by the antenna array of the electronic device 100 according to one embodiment.

Figure 7:
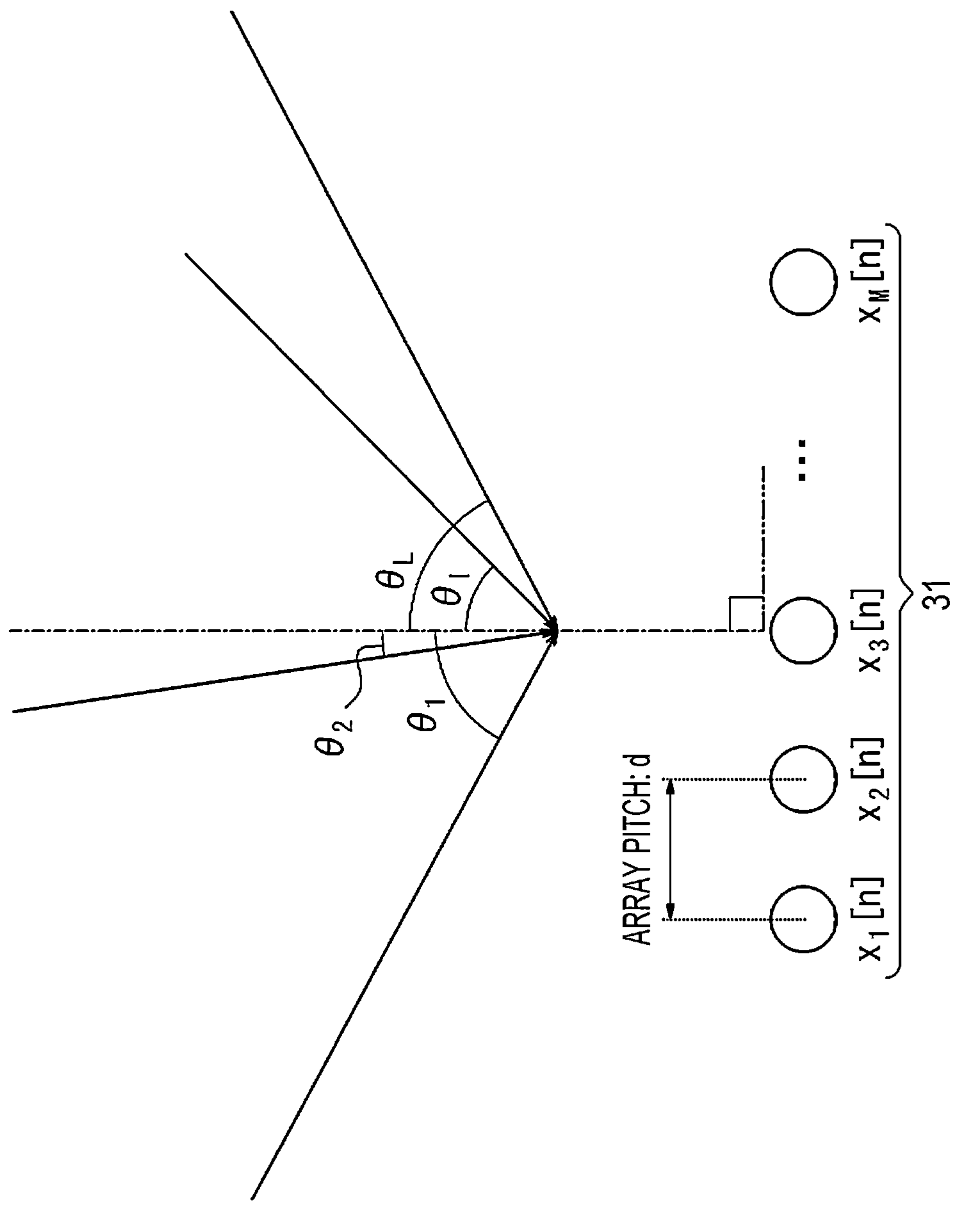
FIG. 7 is a diagram schematically illustrating an example of arrangement of antennas in an antenna array of the electronic device 100 according to one embodiment, and an operation principle thereof.

FIG. 7 is a diagram for explaining the configuration of the reception antenna array 31 of the electronic device 100 according to one embodiment, and explaining the principle of estimating the direction of an arrival wave by the reception antenna array 31. FIG. 7 illustrates an example of receiving a radio wave by the reception antenna array 31.

As illustrated in FIG. 7, the reception antenna array 31 may be an array of sensors such as reception antennas arranged in a straight line. As illustrated in FIG. 7, in one embodiment, the reception antenna array 31 may include a plurality of reception antennas arranged in a straight line. In FIG. 7, small circles represent a plurality of antennas such as antennas $x_1$, $x_2$, $x_3$, . . . , $x_M$ of the reception antenna array 31. The reception antenna array 31 may include any plurality of antennas. As illustrated in FIG. 7, the plurality of antennas constituting the reception antenna array 31 are arranged at intervals of an array pitch d. A sensor array in which sensors (antennas, ultrasonic transducers, microphones, or the like) corresponding to various physical waves are arranged to form an array as described here is referred to also as a uniform linear array (ULA). As illustrated in FIG. 7, the physical waves (such as electromagnetic waves or sound waves) arrive from various directions such as, for example, $\theta_1$ and $\theta_2$. The directions $\theta_1$ and $\theta_2$ mentioned here may be the angles of arrival described above. The sensor array such as the reception antenna array 31 is capable of estimating the direction of arrival (angle of arrival) by using a phase difference caused between measured values of the sensors in accordance with the directions of arrival of the physical waves. The method of estimating the direction of arrival of a wave as described here is referred to also as angle-of-arrival estimation or direction-of-arrival estimation (DoA).

In the electronic device 100 according to one embodiment, at least one of the transmission antenna array 24 or the reception antenna array 31 may be a linear array of a plurality of antennas. This enables directivity to be narrowed appropriately when transmitting/receiving a radio wave at, for example, a millimeter-wave radar. To transmit a transmission wave, a beam former is often used for controlling the direction of a transmission beam. On the other hand, to receive a reflected wave, a subspace method (the above-mentioned MUSIC, ESPRIT, etc.) is often used, rather than a beam former, for estimating the direction of arrival of the reflected wave. In beamforming and sub-spacing, with regard to electromagnetic waves coming from various directions, a phase difference arises between measured values of the sensors of the ULA illustrated in FIG. 7 in accordance with the directions of arrival. Therefore, utilizing the phase difference enables estimating the direction of arrival of the reflected wave.

A further explanation will now be given of angle estimation in two directions of an arrival wave by the antenna array of the electronic device 100 according to one embodiment.

Figure 8:
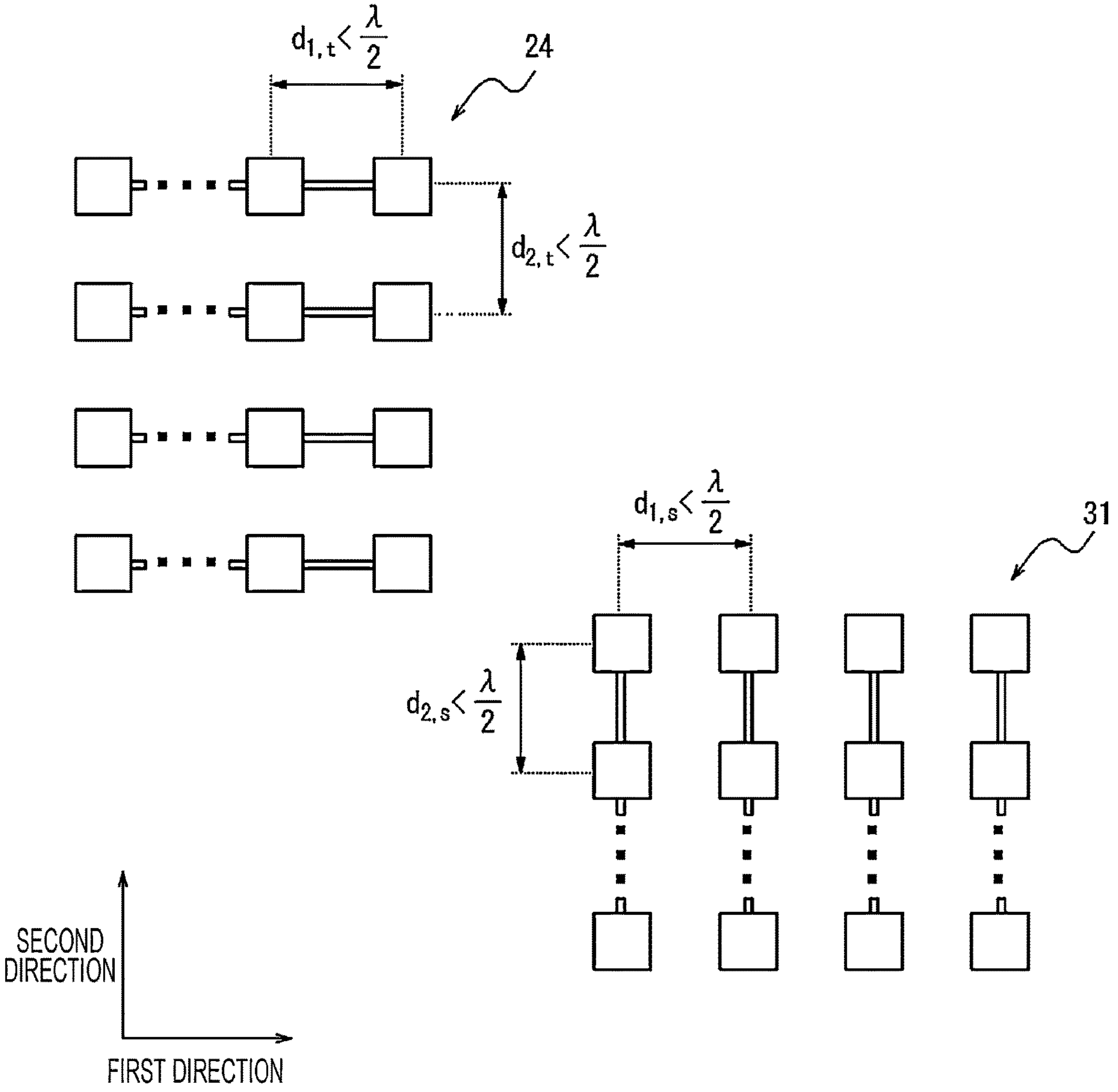
FIG. 8 is a diagram illustrating an example of arrangement of the antennas in the antenna array of the electronic device 100 according to one embodiment.

FIG. 8 is a diagram illustrating an example of antenna arrangement for direction-of-arrival estimation for two orthogonal angles.

As illustrated in FIG. 8, in the electronic device 100 according to one embodiment, the transmission antenna array 24 and/or the reception antenna array 31 may include an array of a plurality of patch antenna units.

In the transmission antenna array 24 illustrated in FIG. 8, one patch antenna unit may include a plurality of elements connected electrically in a first direction illustrated therein. In each patch antenna unit, the plurality of elements may be connected electrically via wiring such as, for example, a strip line on the substrate. In each patch antenna unit, the plurality of elements may be spaced apart from one another by an interval $d_{1,\ t}$, which is shorter than a half of a wavelength λ of a transmission wave. In FIG. 8, any number, two or more, of elements may be electrically connected to configure each patch antenna unit. In FIG. 8, illustration of a part of the elements that are electrically connected is omitted.

As illustrated in FIG. 8, the transmission antenna array 24 may be an array of the plurality of patch antenna units arranged in a second direction illustrated therein. The patch antenna units may be spaced apart from one another by an interval $d_{2,\ t}$, which is shorter than a half of the wavelength 2 of the transmission wave. In one embodiment, the transmission antenna array 24 may include any number, two or more, of patch antenna units.

As illustrated in FIG. 8, in one embodiment, the reception antenna array 31 may have a layout in which the arrangement of the plurality of elements in the transmission antenna array 24 is altered. That is, in the reception antenna array 31 illustrated in FIG. 8, one patch antenna unit may include a plurality of elements connected electrically in the second direction illustrated therein. In each patch antenna unit, the plurality of elements may be connected electrically via wiring such as, for example, a strip line on the substrate. In each patch antenna unit, the plurality of elements may be spaced apart from one another by an interval $d_{2,\ s}$, which is shorter than a half of the wavelength λ of the transmission wave. In FIG. 8, any number, two or more, of elements may be electrically connected to configure each patch antenna unit. In FIG. 8, illustration of a part of the elements that are electrically connected is omitted.

As illustrated in FIG. 8, the reception antenna array 31 may be an array of the plurality of patch antenna units arranged in the first direction illustrated therein. The patch antenna units may be spaced apart from one another by an interval $d_{1,\ s}$, which is shorter than a half of the wavelength λ of the transmission wave. In one embodiment, the reception antenna array 31 may include any number, two or more, of patch antenna units.

All of the elements included in the transmission antenna array 24 and the reception antenna array 31 may be disposed on the same plane (for example, on a surface layer of the same substrate). The transmission antenna array 24 and the reception antenna array 31 may be disposed in proximity to each other (monostatic). The first direction and the second direction illustrated in FIG. 8 may be geometrically orthogonal to each other.

The transmission antenna array 24 and the reception antenna array 31 illustrated in FIG. 8 make it possible to narrow the respective directivities of the transmission antennas and the reception antennas appropriately. A beam former in the second direction illustrated in FIG. 8 can be realized by using the transmission antenna array 24 illustrated in FIG. 8 to control the direction of transmitting each transmission wave at each timing of transmitting the transmission wave (transmission signal). Using the reception antenna array 31 illustrated in FIG. 8 realizes estimation of the direction of arrival of a reflected wave regarding the first direction illustrated in FIG. 8. In this way, the direction of arrival of the reflected wave can be estimated regarding the two angles that are substantially orthogonal to each other. Therefore, a point group indicating the object entity such as the target device 200 can be acquired in a three-dimensional manner.

A method of detecting vibrations of the target device 200 by the electronic device 100 according to one embodiment will now be described.

The electronic device 100 according to one embodiment detects vibrations of the target device 200 on the basis of the result of transmitting a transmission wave of millimeter-wave radar or the like to the target device 200 and then receiving a reflected wave reflected off the target device 200. As described earlier, the target device 200 may be an engine, a machine tool, a lathe machine, a processing machine, or conveyance such as an automobile, etc., but is not limited to them, and thus may be any other kind of apparatus. Studied below is a method of estimating the heart rate interval of the target device 200 on the basis of the results of performing 2D-FFT, CFAR processing, and direction-of-arrival estimation described above, etc. First, how vibrations are expressed as the result of 2D-FFT performed in FIGS. 4 and 5 will now be described.

Note that, in a case where the electronic device 100 according to one embodiment detects biological information, the electronic device 100 detects a heartbeat of the subject on the basis of the result of transmitting a transmission wave of millimeter-wave radar or the like to the target device 200 and then receiving a reflected wave reflected off the chest where the heart of the subject exists. As described earlier, the subject may be a human or an animal.

Figure 9:
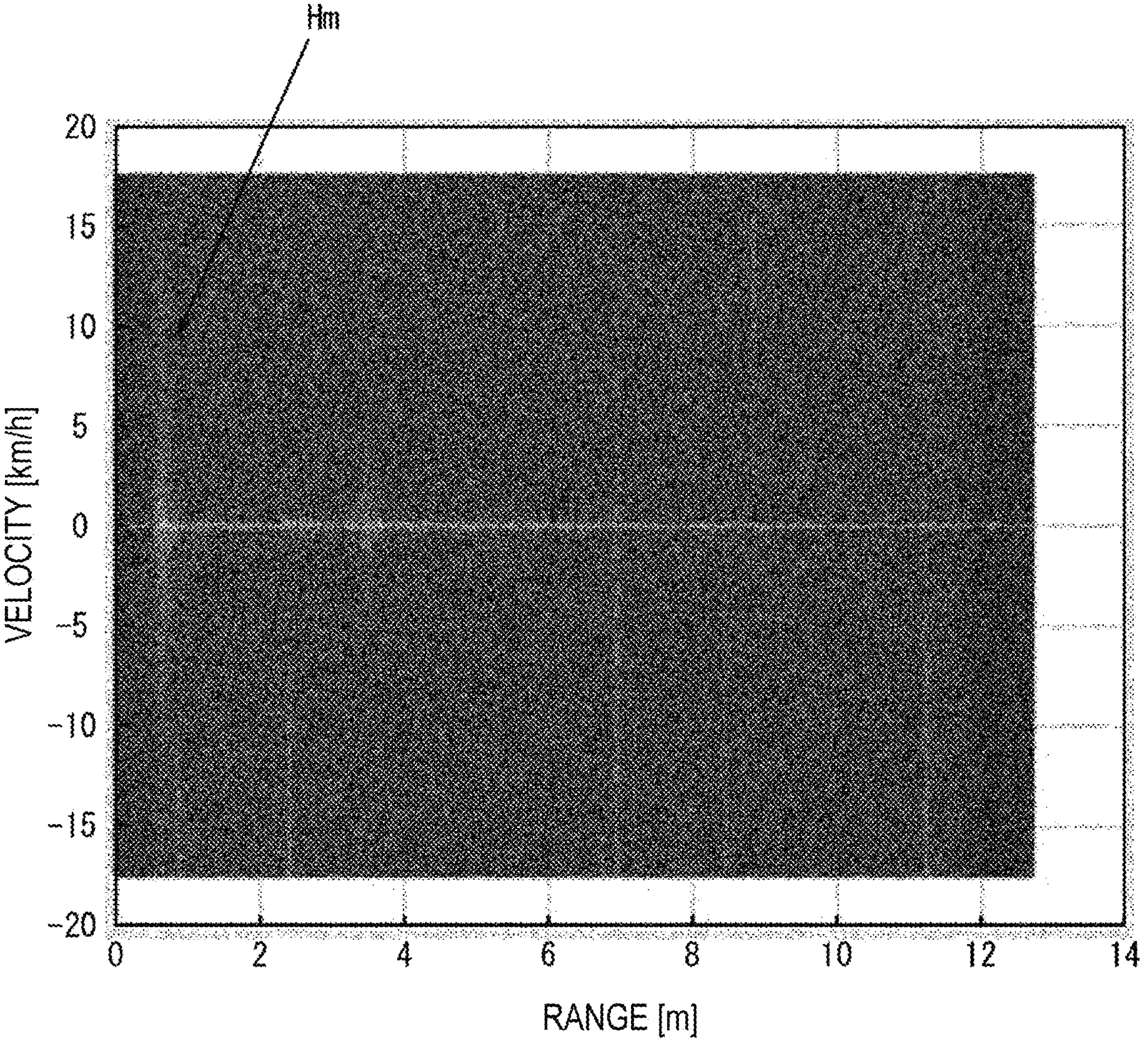
FIG. 9 is a diagram illustrating an example of processing of a signal by the electronic device 100 according to one embodiment.

FIG. 9 is a diagram illustrating an example of the result of 2D-FFT performed by receiving a reflected wave of a transmission wave transmitted toward the target device 200. FIG. 9 illustrates, as the result of 2D-FFT, a spectrum representing vibrations of the target device 200. FIG. 9 illustrates a range-Doppler spectrum corresponding to vibrations of the target device 200. In FIG. 9, the horizontal axis represents distance (range) and the vertical axis represents speed (velocity). The signal processing unit 10 (for example, the vibration displacement extraction processing unit 14) of the electronic device 100 according to one embodiment may, for example, extract a peak Hm illustrated in FIG. 9 as a vibration of the target device 200.

The peak Hm illustrated in FIG. 9 includes many components in a Doppler direction (velocity direction). This indicates that the detected target device 200 includes many vibration components (rigid-body motion and micro-vibrations). With regard to an actual vibration velocity, a signal $d_v$ that is a phase extract of a one-dimensional time-series IQ signal $s_v$ obtained by adding a part included in one chirp signal to a two-dimensional signal s defines a vibration displacement of a vibrating body. A vibration displacement of a vibrating body that gives rise to an actual vibration velocity is indicated by a signal de that is a phase extract of a one-dimensional time-series IQ signal $s_v$ obtained by adding a part included in one chirp signal to a two-dimensional signal s. The two-dimensional signal s mentioned above is an inverse Fourier transform of a two-dimensional signal s having been subjected to filtering of, on the 2D-FFT plane illustrated in FIG. 9, only signal components of the peak Hm illustrated in FIG. 9.

The vibration displacement $d_v$ mentioned above cannot be detected except for components in a moving-radius direction from the vibrating body toward the radar. Though the vibrating body is supposed to have a three-axis vibration displacement under ordinary circumstances, if the method described above is used, only a projection in the moving-radius direction is obtained as dy. Therefore, there is a possibility that sufficient information cannot be restored when restoration of vibrations of the object that are otherwise restorable is attempted using the radar.

As described above, the reception antenna array 31 illustrated in FIG. 8 makes it possible to realize a beam former in the second direction illustrated in FIG. 8 and to realize the estimation of the direction of arrival of a reflected wave in the first direction illustrated in FIG. 8. Therefore, the direction of arrival of the reflected wave can be estimated regarding the two angles that are substantially orthogonal to each other, and a point group indicating the object entity such as the target device 200 can be acquired in a three-dimensional manner. That is, performing the direction estimation using the antennas illustrated in FIG. 8 makes it possible to calculate a distance, an azimuth angle, and an elevation angle and thus to acquire a point group indicating the object entity in a three-dimensional manner. However, information about a velocity held by each data point that is acquired is still the above-mentioned $d_v$ only.

As described above, when vibrations such as, for example, a body motion of a human are detected using a Doppler radar, range measurement of a particular portion of the subject that vibrates, angle measurement (direction estimation) thereof, and vibration velocity extraction thereof can be performed by using a pair of transmission and reception antenna arrays. However, if the method described above is used, the only thing that can measured in a Doppler shift of the radar is a velocity in a moving-radius direction from the subject toward the radar.

For a solution, the electronic device 1 according to one embodiment to be described below enables measurement inclusive of a velocity in a normal-line direction normal to a moving-radius direction toward the radar when extracting a vibration velocity of the subject that vibrates. That is, the electronic device 1 according to one embodiment, just with a single device configuration, enables measurement of, for example, vibrations in two dimensions or in higher-order dimensions by combining a plurality of Doppler radars using a quasi-millimeter-wave frequency or higher (for example, 20 GHz or higher). The electronic device 1 according to one embodiment enables detection of micro-vibrations of an object as micro-Doppler by using Doppler radars configured to perform distance measurement (range measurement) using an electromagnetic wave or a sound wave, for example, angle estimation (angle measurement), and Doppler velocity detection (velocity measurement).

The electronic device 1 according to one embodiment described above will now be described.

The electronic device 1 according to one embodiment may mainly include feature(s) of the following aspect(s). Specifically, the electronic device 1 according to one embodiment may include (A) a feature about antenna arrangement and antenna configuration and (B) a feature about system design. These features will now be further described.

(A) Feature about Antenna Arrangement and Antenna Configuration

The electronic device 1 according to one embodiment may include at least two, for example, three, reception antennas (reception antenna arrays). The plurality of reception antennas in the electronic device 1 according to one embodiment may be arranged such that they are not in the same orientation as one another. For example, the plurality of reception antennas in the electronic device 1 according to one embodiment may be arranged in different orientations from one another. In the electronic device 1 according to one embodiment, the respective antennas may be arranged such that the distance between the center of one antenna and the center of another antenna is not greater than a predetermined distance. The predetermined distance may be a distance set such that the distance from the center of each antenna to the vibrating body is not greater than the range (distance) resolution of the radar. The distance to the vibrating body may be determined on the basis of the minimum installation distance set as radar-module specifications. The feature of the above-described aspect of the electronic device 1 according to one embodiment will be simply referred to also as "feature A". A more detailed description of the feature A will be given later.

(B) Feature about System Design

The electronic device 1 according to one embodiment may be configured such that an antenna set described about the feature A above is housed in one radar module. The electronic device 1 according to one embodiment may include a plurality of reception systems integrated together. The electronic device 1 according to one embodiment may achieve angular concordance by correcting an angle detected by each antenna into an angle on a global coordinate system. By using the integrated reception system, for example, the electronic device 1 according to one embodiment enables three-dimensional detection of the displacement (or a velocity or an acceleration, etc.) of the subject that vibrates. The feature of the above-described aspect of the electronic device 1 according to one embodiment will be simply referred to also as "feature B". A more detailed description of the feature B will be given later.

Each of the feature A and the feature B described above will now be described in more details.

(Details on Feature A)

Figure 10:
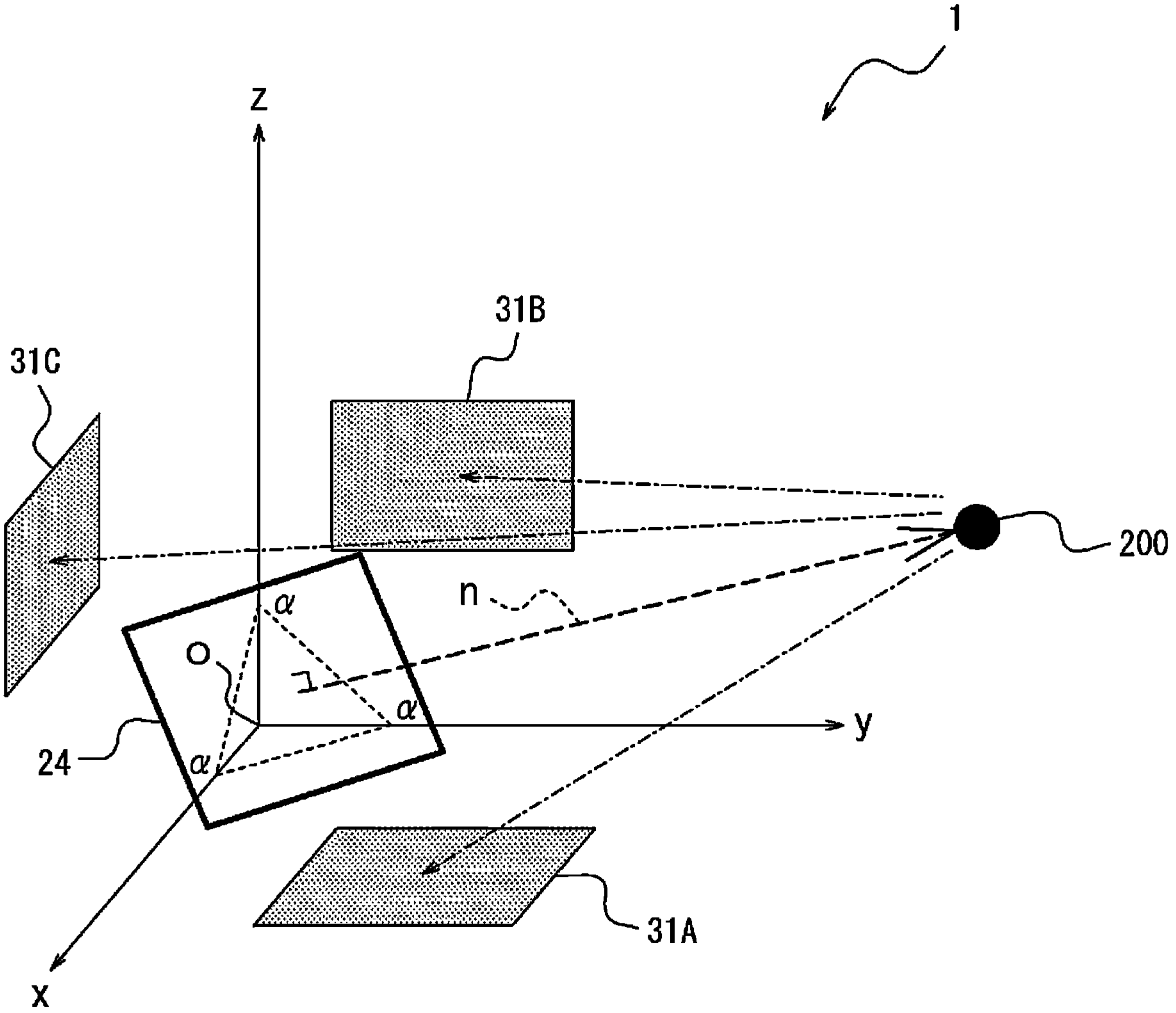
FIG. 10 is a diagram illustrating an example of arrangement of antennas in an electronic device 1 according to one embodiment.

FIG. 10 is a diagram illustrating an example of arrangement of antennas in the electronic device 1 according to one embodiment. The electronic device 1 according to one embodiment may include at least one transmission antenna array 24 and a plurality of reception antenna arrays 31. The electronic device 1 according to one embodiment illustrated in FIG. 10 includes one transmission antenna array 24 and three reception antenna arrays 31A, 31B, and 31C. A term "reception antenna array 31" may be hereinafter simply used when no distinction is made between/among a plurality of reception antenna arrays such as the reception antenna array 31A, the reception antenna array 31B, and the reception antenna array 31C.

The transmission antenna array 24 described here may have the same configuration as that of the transmission antenna array 24 of the electronic device 100 described earlier with reference to FIG. 2 and the like. In the electronic device 1 according to one embodiment, the transmission antenna array 24 does not necessarily have to be an array antenna, nor necessarily have to be made up of a plurality of antenna elements. For example, in the electronic device 1 according to one embodiment, a plurality of antenna elements that is not arranged in an array layout may be adopted as a transmission antenna in place of the transmission antenna array 24. Alternatively, for example, in the electronic device 1 according to one embodiment, one antenna element may be adopted as a transmission antenna in place of the transmission antenna array 24. In the description of the electronic device 1 according to one embodiment below, as illustrated in FIG. 10, the transmission antenna is assumed to be a plane-type transmission antenna array 24 such as, for example, a patch antenna (microstrip antenna).

As illustrated in FIG. 10, in the electronic device 1 according to one embodiment, for example, the transmission antenna array 24 may be disposed on a plane passing through a point on the x axis, a point on the y axis, and a point on the z axis each of which lies at a distance of $\alpha$ from the origin O. That is, the transmission antenna array 24 may be located on a plane $x+y+z-a=0$ lying at a distance of $\alpha/\sqrt{3}$ from the origin O illustrated in FIG. 10. The center of the transmission antenna array 24 may, for example, lie on a straight line $x=y=z$ (or in the neighborhood of this line) in a space defined by the x axis, the y axis, and the z axis illustrated in FIG. 10. The center of the transmission antenna array 24 mentioned here may be the center of a plurality of antenna elements (for example, those arranged in an array layout) that constitute the transmission antenna array 24.

Disposing the transmission antenna as described above makes it possible to bring the center line of the radar module into alignment with a normal line n passing through the center of the transmission antenna. The radar module mentioned here may be a module that includes the transmission antenna and/or the reception antennas. Disposing the transmission antenna as described above makes it possible to equally distribute the energy of an electromagnetic wave to the x-axis direction, the y-axis direction, and the z-axis direction.

The reception antenna array 31 may have the same configuration as that of the reception antenna array 31 of the electronic device 100 described earlier with reference to FIG. 2 and the like. The electronic device 1 according to one embodiment may include two or more transmission antenna arrays 24 and/or two, or four or more, reception antenna arrays 31 as needed. In the description of the electronic device 1 according to one embodiment below, as illustrated in FIG. 10, the reception antenna array 31 is assumed to be a plane-type antenna array such as, for example, a patch antenna (microstrip antenna).

As illustrated in FIG. 10, in the electronic device 1 according to one embodiment, the reception antenna arrays 31 may be arranged such that they are not in the same orientation as one another, for example, such that they are in different orientations from one another. The antenna "orientation" may be, for example, in a case of an antenna array, a direction orthogonal to a direction in which plural antennas constituting the antenna array are arranged. The antenna "orientation" may be, for example, in a case of a plane-type antenna, a direction perpendicular to a plane of the plane-type antenna.

In one embodiment, the antenna "orientation" may be a direction perpendicular to a receiving surface of a receiving antenna. In one embodiment, the antenna "orientation" may be, for example, a direction perpendicular to a radiating surface of a plane-type antenna.

The reception antenna array 31A illustrated in FIG. 10 is disposed on the XY plane. For example, as illustrated in FIG. 10, the reception antenna array 31A may be disposed on the XY plane at a position near the origin O. The reception antenna array 31A may be disposed in the neighborhood, etc. of the XY plane illustrated in FIG. 10. The reception antenna array 31B illustrated in FIG. 10 is disposed on the YZ plane. For example, as illustrated in FIG. 10, the reception antenna array 31B may be disposed on the YZ plane at a position near the origin O. The reception antenna array 31B may be disposed in the neighborhood, etc. of the YZ plane illustrated in FIG. 10. The reception antenna array 31C illustrated in FIG. 10 is disposed on the ZX plane. For example, as illustrated in FIG. 10, the reception antenna array 31C may be disposed on the ZX plane at a position near the origin O. The reception antenna array 31C may be disposed in the neighborhood, etc. of the ZX plane illustrated in FIG. 10. The arrangement of the reception antenna arrays 31 illustrated in FIG. 10 is just an example. Therefore, the reception antenna arrays 31 may be arranged differently from the arrangement illustrated in FIG. 10.

In the example illustrated in FIG. 10, the reception antenna array 31A is disposed on the XY plane, the reception antenna array 31B is disposed on the YZ plane, and the reception antenna array 31C is disposed on the ZX plane. Therefore, the orientation of the reception antenna array 31A is parallel to the Z axis illustrated in FIG. 10, the orientation of the reception antenna array 31B is parallel to the X axis illustrated in FIG. 10, and the orientation of the reception antenna array 31C is parallel to the Y axis illustrated in FIG. 10.

The plurality of reception antenna arrays 31 may be arranged within a predetermined distance from one another such that the interval therebetween is, for example, a short-range interval. Each of the plurality of reception antenna arrays 31 is capable of detecting an object that is the same target as point-group coordinates. Setting a short distance between the respective centers of the reception antenna arrays 31 as described above makes it possible to ignore a difference among distances to the target. The center of the reception antenna array 31 mentioned here may be the center of a plurality of antenna elements (for example, those arranged in an array layout) that constitute the reception antenna array 31.

In one embodiment, each interval between one and another of the plurality of reception antenna arrays 31 may be set in such a way as to be less than the distance (range) resolution of the radar in relation to the predetermined object (the target device 200) that is the target. For example, let $d_{ij}$ be the distance between any two reception antenna arrays i and j among the plurality of reception antenna arrays 31, let $D_i$ be the distance between the reception antenna array i and the target, Let $D_j$ be the distance between the reception antenna array j and the target. The position of the reception antenna array i, the position of the reception antenna array j, and the position of the target may be the center position of the reception antenna array i, the center position of the reception antenna array j, and the center position of the target, respectively. In this case, the following formula, Formula (1), holds.

[Formula 1]

$$\|D_i - D_j\| \leq d_{ij} \tag{1}$$

Figure 11:
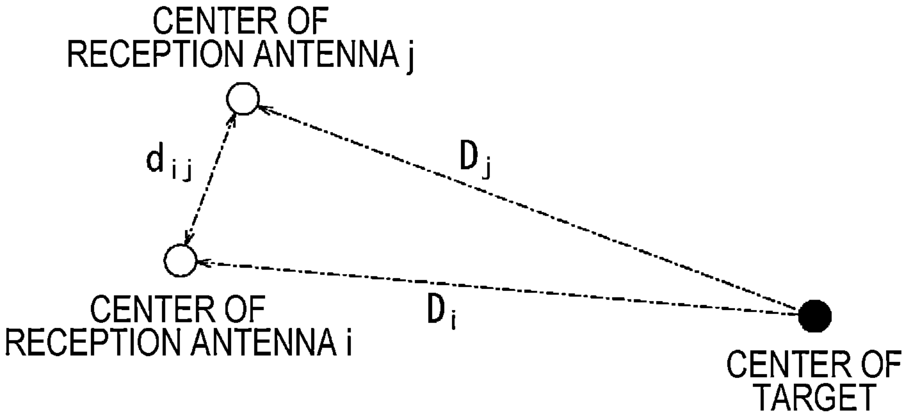
FIG. 11 is a diagram illustrating an example of processing of a signal by the electronic device 1 according to one embodiment.

When the sign of inequality is true in Formula (1) disclosed above, the positions (of the centers) of the reception antenna arrays i and j and the position (of the center) of the target are in a layout illustrated in FIG. 11. That is, when the sign of inequality is true in Formula (1) disclosed above, (the centers of) the reception antenna arrays i and j and (the center of) the target do not lie in a straight line.

Figure 12:
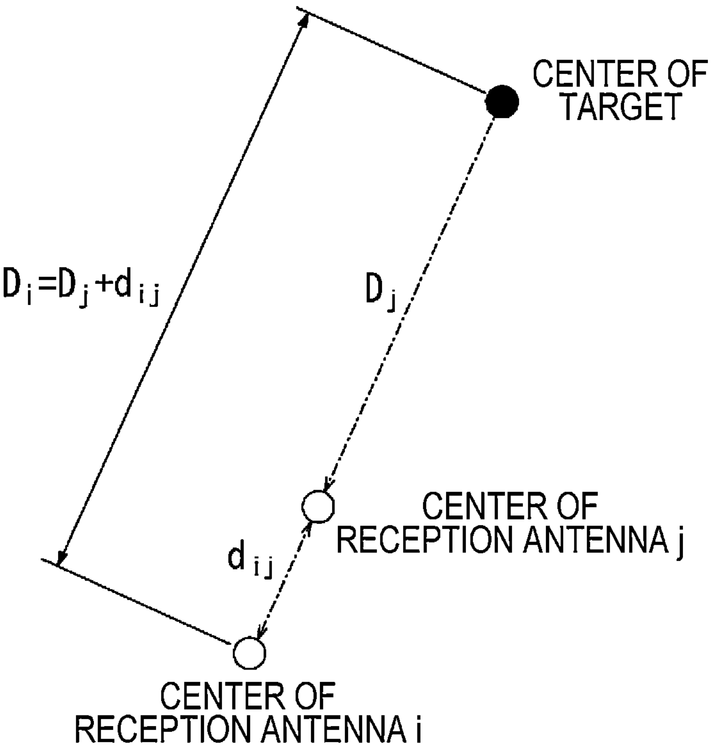
FIG. 12 is a diagram illustrating an example of processing of a signal by the electronic device 1 according to one embodiment.

On the other hand, when the sign of equality is true in Formula (1) disclosed above, the positions (of the centers) of the reception antenna arrays i and j and the position (of the center) of the target are in a layout illustrated in FIG. 12. That is, when the sign of equality is true in Formula (1) disclosed above, (the centers of) the reception antenna arrays i and j and (the center of) the target lie in a straight line. The case where the reception antenna arrays i and j and the target lie in a straight line as illustrated in FIG. 12 is a case where the target device 200 lies at the back side of any of the reception antenna arrays 31 in FIG. 10. Therefore, in the configuration of the electronic device 1 according to one embodiment, it suffices to consider only a case where the sign of inequality is true in Formula (1) disclosed above. For the above reason, in the electronic device 1 according to one embodiment, the three reception antenna arrays 31 may be arranged such that the interval between the centers of any two reception antenna arrays 31 does not change the range. Therefore, in the electronic device 1 according to one embodiment, the plurality of reception antenna arrays 31 may be arranged in such a way as to satisfy Formula (2) disclosed below, where $d_{ij}$ denotes the distance between any two reception antenna arrays i and j, and $r_s$ denotes the range resolution of the radar.

[Formula 2]

$$d_{ij} \leq r_s \tag{2}$$

(Details on Feature B)

In the electronic device 1 according to one embodiment, the transmission antenna array 24 and the three reception antenna arrays 31 illustrated in FIG. 10 may be housed in one radar module. With this configuration, in the electronic device 1 according to one embodiment, displacement of vibration obtained for one data point can be acquired as a three-dimensional vector. Therefore, the electronic device 1 according to one embodiment makes it possible to detect displacement of vibration, etc. of a predetermined object (the subject/the target device 200) that is the target in a three-dimensional manner.

As described above, in the electronic device 1 according to one embodiment, each of the plurality of reception antenna arrays 31 is capable of detecting an object that is the same target as point-group coordinates. In addition, as described above, in the electronic device 1 according to one embodiment, the difference among the distances to the target can be ignored by setting a short distance between the respective centers of the reception antenna arrays 31. With this configuration, each of the plurality of reception antenna arrays 31 is capable of calculating point-group coordinates detected as the target on the basis of two angles such as an azimuth angle and an elevation angle that are obtained through distance (range) and direction estimation.

The electronic device 1 according to one embodiment may perform coordinate transformation of the coordinates of the target detected by each of the plurality of reception antenna arrays 31 as described above, for example, by using a transformation matrix that is based on Euler angles.

The coordinate transformation based on Euler angles can be performed through the following steps (i) to (iii).

(i) Coordinates (x, y, z) are transformed into coordinates (x', y', z') by performing rotation on the z axis by an angle of rotation φ.

(ii) The coordinates (x', y', z') are transformed into coordinates (x", y", z") by performing rotation on the x axis by an angle of rotation θ.

(iii) After the above transformation in (ii), the coordinates (x", y", z") are transformed into coordinates (x'", y'", z'") by performing rotation on the z" axis by an angle of rotation ψ.

The coordinate system can be rotated through the three-step transformation described above. The coordinates (x'", y'", z'") after the transformation and the original coordinates (x, y, z) can be calculated from, for example, Formula (3) disclosed below.

[Formula 3]

$$\begin{bmatrix} x''' \\ y''' \\ z''' \end{bmatrix} = \begin{bmatrix} \cos\psi\cos\theta\cos\phi - \sin\psi\sin\phi & -\sin\psi\cos\theta\cos\phi - \cos\psi\sin\phi & \sin\theta\cos\phi \\ \cos\psi\cos\theta\sin\phi + \sin\psi\cos\phi & -\sin\psi\cos\theta\cos\phi + \cos\psi\cos\phi & \sin\theta\sin\phi \\ -\cos\psi\sin\theta & \sin\psi\sin\theta & \cos\theta \end{bmatrix} \begin{bmatrix} x \\ y \\ z \end{bmatrix} \tag{3}$$

Figure 13:
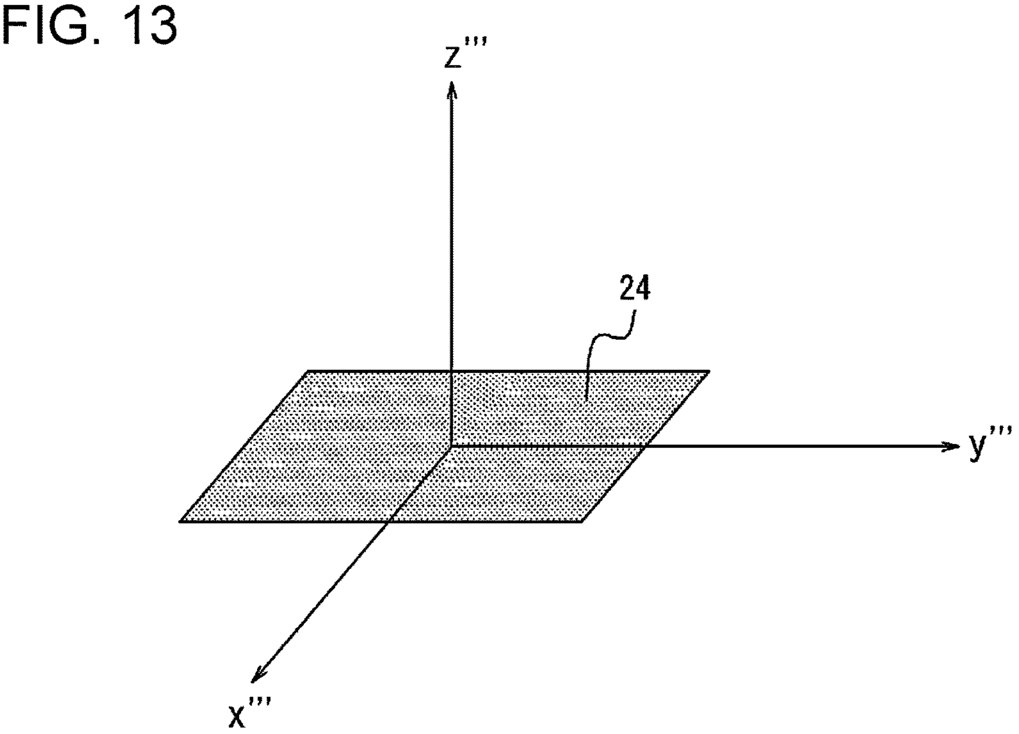
FIG. 13 is a diagram illustrating an example of processing of a signal by the electronic device 1 according to one embodiment.

In one embodiment, for example, as illustrated in FIG. 13, a coordinate system taking the transmission antenna array 24 as the reference may be set. The coordinate system illustrated in FIG. 13 is defined by the x'" axis, the y'" axis, and the z'" axis. In the coordinate system illustrated in FIG. 13, the transmission antenna array 24 is disposed on the x'"y'" plane. In addition, in the coordinate system illustrated in FIG. 13, the center of the transmission antenna array 24 lies at the same point as the origin of the x'"y'" plane (or in the neighborhood thereof). The coordinate system taking the transmission antenna array 24 as the reference as illustrated in FIG. 13 will be referred to also as "global coordinate system". The electronic device 1 according to one embodiment may transform the point group of the subject detected by the reception antenna arrays 31 into coordinates in the global coordinate system illustrated in FIG. 13.

For example, the electronic device 1 according to one embodiment, when transforming a coordinate system taking the reception antenna array 31A illustrated in FIG. 10 as the reference into the global coordinate system illustrated in FIG. 13, may perform coordinate transformation under φ=−45°, θ=−45°, and ψ=−45° in Formula (3) disclosed above. Coordinate transformation may be performed similarly to the above when a coordinate system taking the reception antenna array 31B as the reference is transformed into the global coordinate system and when a coordinate system taking the reception antenna array 31C as the reference is transformed into the global coordinate system. The electronic device 1 according to one embodiment may superimpose point groups of the subject that are generated in the global coordinate system as described above.

As described above, the electronic device 1 according to one embodiment is capable of detecting a faint and weak displacement such as, for example, vibrations of an apparatus. The electronic device 1 according to one embodiment is capable of detecting faint and weak oscillations such as a heartbeat in a human body. The subject that is to be detected by the electronic device 1 according to one embodiment is not specifically limited. The subject that is to be detected by the electronic device 1 according to one embodiment may be an engine, a machine tool, a lathe machine, a processing machine, or conveyance such as an automobile, etc., but is not limited to them, and thus may be any other kind of apparatus. A further explanation will now be given of operation for a case where the electronic device 1 according to one embodiment calculates the displacement of the subject that vibrates.

Figure 14:
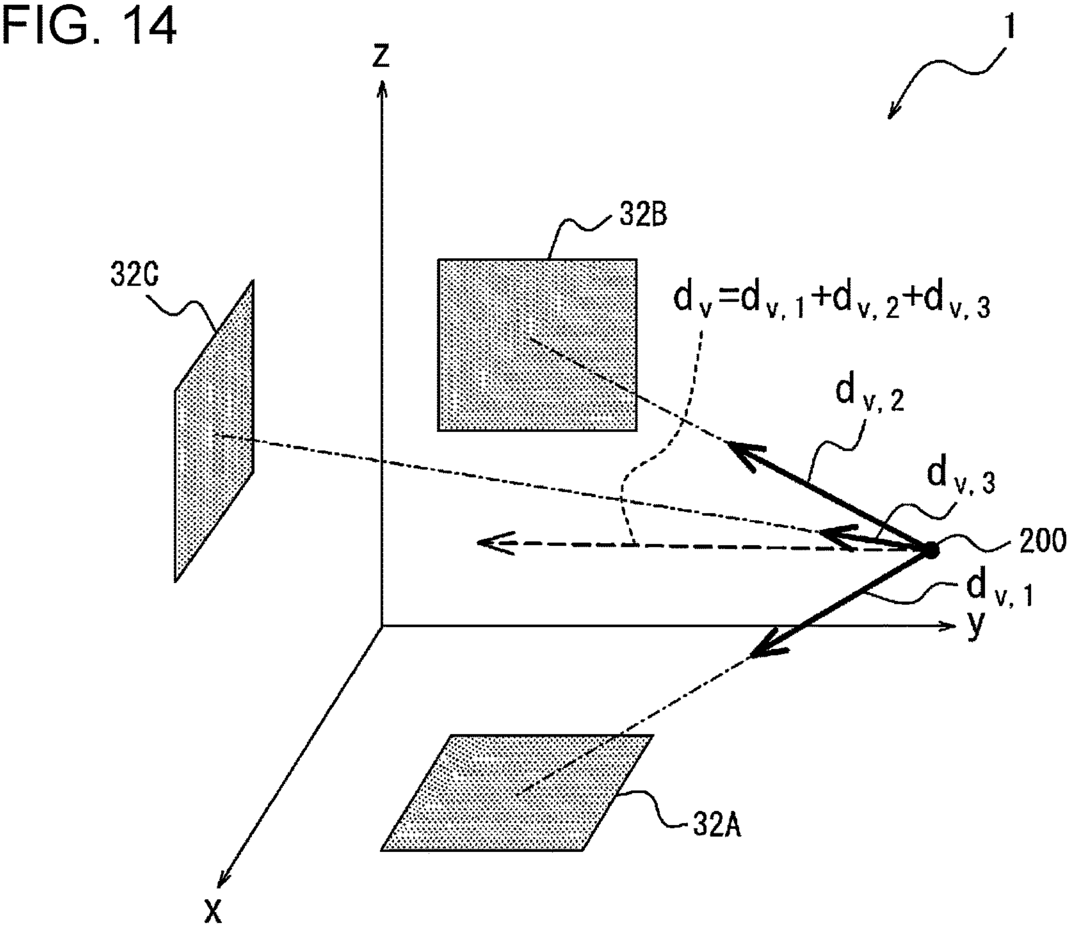
FIG. 14 is a diagram illustrating an example of processing of a signal by the electronic device 1 according to one embodiment.

FIG. 14 is a diagram that conceptually illustrates a synthesis of the displacement detected by each of three reception antenna arrays 31 in the electronic device 1 according to one embodiment. In FIG. 14, for the convenience of explanation, the three reception antenna arrays 31 only of the electronic device 1 according to one embodiment are illustrated, and illustration of the transmission antenna array 24 is omitted.

As illustrated in FIG. 14, displacement arising from vibrations of the target device 200 is calculated as micro-Doppler on a straight line connecting a point where the target device 200 is detected (one point among those in a point group) to the center of each of the reception antenna arrays 31. A vector $d_{v,1}$ illustrated in FIG. 14 is a vector calculated as micro-Doppler caused due to displacement by vibrations of the target device 200 on a straight line connecting a point where the target device 200 is detected to the center of the reception antenna array 31A. A vector $d_{v,2}$ illustrated in FIG. 14 is a vector calculated as micro-Doppler caused due to displacement by vibrations of the target device 200 on a straight line connecting a point where the target device 200 is detected to the center of the reception antenna array 31B. A vector $d_{v,3}$ illustrated in FIG. 14 is a vector calculated as micro-Doppler caused due to displacement by vibrations of the target device 200 on a straight line connecting a point where the target device 200 is detected to the center of the reception antenna array 31C.

As illustrated in FIG. 14, the vector $d_{v,1}$, the vector $d_{v,2}$, and the vector $d_{v,3}$ are linearly independent. Therefore, the displacement of vibration detected as that of the target device 200 can be calculated on the basis of the vectors disclosed in Formula (4) below.

[Formula 4]

$$d_v = d_{v,1} + d_{v,2} + d_{v,3} \tag{4}$$

As described above, in the electronic device 1 according to one embodiment, the displacement vectors of vibrations obtained for the one detected object 200 are three vectors $d_{v,1}$, $d_{v,2}$, and $d_{v,3}$. That is, in the electronic device 1 according to one embodiment, for example, the displacement vector $d_{v,1}$ of vibrations is obtained on the basis of a reflected wave received by the transmission antenna array 24A. In the electronic device 1 according to one embodiment, for example, the displacement vector $d_{v,2}$ of vibrations is obtained on the basis of a reflected wave received by the transmission antenna array 24B. In the electronic device 1 according to one embodiment, for example, the displacement vector $d_{v,3}$ of vibrations is obtained on the basis of a reflected wave received by the transmission antenna array 24C. Therefore, the electronic device 1 according to one embodiment makes it possible to detect displacement of vibration, etc. of a predetermined object (the subject/the target device 200) that is the target in a three-dimensional manner.

Figure 15:
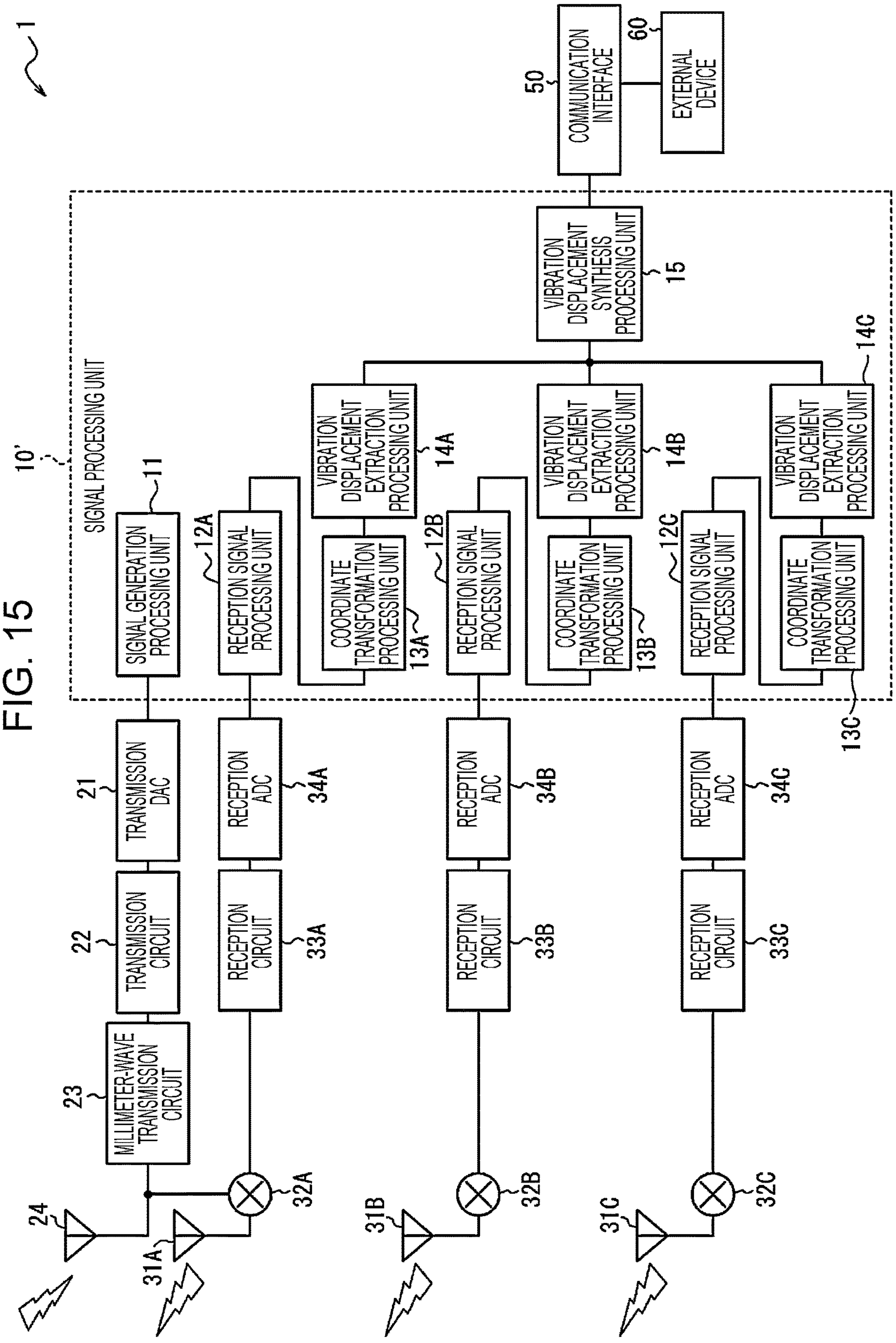
FIG. 15 is a block diagram schematically illustrating a configuration of the electronic device 1 according to one embodiment.

FIG. 15 is a block diagram illustrating a functional configuration of the electronic device 1 according to one embodiment. In the block diagram of the electronic device 1 according to one embodiment illustrated in FIG. 15, the same reference signs are assigned to components that are the same as or similar to, or components that correspond to, those in the block diagram of FIG. 2. The electronic device 1 according to one embodiment illustrated in FIG. 15 has a configuration that is partially the same as that of the electronic device 100 illustrated in FIG. 2; therefore, the same explanation as that of the electronic device 100 illustrated in FIG. 2 or an explanation similar thereto will be simplified or omitted where appropriate.

Being comparatively different from the electronic device 100 illustrated in FIG. 2, the electronic device 1 according to one embodiment illustrated in FIG. 15 includes a plurality of functional units (three functional units in the example illustrated in FIG. 15) related to the receiving system. That is, the electronic device 1 according to one embodiment illustrated in FIG. 15 may include the reception antenna arrays 31A, 31B, and 31C in place of the reception antenna array 31 illustrated in FIG. 2. Similarly, the electronic device 1 according to one embodiment illustrated in FIG. 15 may include mixers 32A, 32B, and 32C in place of the mixer 32 illustrated in FIG. 2. The electronic device 1 according to one embodiment illustrated in FIG. 15 may include reception circuits 33A, 33B, and 33C in place of the reception circuit 33 illustrated in FIG. 2. The electronic device 1 according to one embodiment illustrated in FIG. 15 may include reception ADCs 34A, 34B, and 34C in place of the reception ADC 34 illustrated in FIG. 2. Each of these functional units related to the receiving system may function in the same manner as, or in a manner similar to, the counterpart described earlier with reference to FIG. 2.

The electronic device 1 according to one embodiment illustrated in FIG. 15 may include the a signal processing unit 10' in place of the signal processing unit 10 of the electronic device 100 illustrated in FIG. 2. As illustrated in FIG. 15, the signal processing unit 10' may include reception signal processing units 12A, 12B, and 12C in place of the reception signal processing unit 12 of the signal processing unit 10 illustrated in FIG. 2. As illustrated in FIG. 15, the signal processing unit 10' may include vibration displacement extraction processing units 14A, 14B, and 14C in place of the vibration displacement extraction processing unit 14 of the signal processing unit 10 illustrated in FIG. 2. Each of these functional units may function in the same manner as, or in a manner similar to, the counterpart described earlier with reference to FIG. 2.

As illustrated in FIG. 15, the signal processing unit 10' of the electronic device 1 according to one embodiment may include coordinate transformation processing units 13A, 13B, and 13C. A term "coordinate transformation processing unit 13" may be hereinafter simply used when no distinction is made between/among a plurality of coordinate transformation processing units such as the coordinate transformation processing unit 13A, the coordinate transformation processing unit 13B, and the coordinate transformation processing unit 13C.

Each coordinate transformation processing unit 13 illustrated in FIG. 15 performs processing of transforming coordinate information supplied from the corresponding reception signal processing unit 12 connected thereto into coordinates in a different coordinate system. In one embodiment, the coordinate transformation processing unit 13 may perform the above-described coordinate transformation that is based on Euler angles (see Formula (3) disclosed above). The coordinate information after the coordinate transformation performed by each coordinate transformation processing unit 13 may be supplied to the corresponding vibration displacement extraction processing unit 14 provided downstream thereof as illustrated in FIG. 15. Each vibration displacement extraction processing unit 14 may extract displacement of vibration in the corresponding direction.

As illustrated in FIG. 15, the signal processing unit 10' of the electronic device 1 according to one embodiment may include a vibration displacement synthesis processing unit 15. The vibration displacement synthesis processing unit 15 may perform processing of synthesizing pieces of the transformed coordinate information supplied from the vibration displacement extraction processing units 14 of respective directions (see Formula (4) disclosed above). That is, based on an angle formed by the direction of arrival of a reception wave in each direction according to estimation by each reception antenna array 31 and the detected position of the target device 200 that vibrates, the vibration displacement synthesis processing unit 15 may perform projection onto each of the x, y, and z directions. By this means, the vibration displacement synthesis processing unit 15 may calculate $d_{v,x}$, $d_{v,y}$, and $d_{v,z}$ described above and may performing processing of putting the displacement vectors $d_{v,1}$, $d_{v,2}$, and $d_{v,3}$ together in time series into one piece of data.

As described above, the electronic device 1 according to one embodiment may include at least one transmission antenna (for example, the transmission antenna array 24), a plurality of reception antenna arrays 31, and a signal processing unit 10'. In one embodiment, each of the plurality of reception antenna arrays 31 may include a plurality of reception antennas configured to receive a reflected wave that is a transmission wave having been reflected. As described above, the plurality of reception antenna arrays 31 may be arranged such that they are in different orientations from one another. Based on a transmission signal transmitted as the transmission wave and a reception signal received as the reflected wave, the signal processing unit 10' detects the displacement of a subject. The signal processing unit 10' may synthesizes the displacement of the subject detected by each of the plurality of reception antenna arrays 31 in a coordinate system of a plurality of dimensions identical thereto.

The electronic device 1 according to one embodiment may include, for example, three reception antenna arrays 31 as the plurality of reception antenna arrays 31. In this case, the signal processing unit 10' may synthesize the displacement of the subject detected by each of the three reception antenna arrays in a coordinate system of three dimensions identical thereto. In one embodiment, the signal processing unit 10' may synthesize the displacement of the subject detected by each of the plurality of reception antenna arrays 31 after performing coordinate transformation into a coordinate system of a plurality of dimensions by using, for example, a transformation matrix that is based on Euler angles.

In the electronic device 1 according to one embodiment, based on a transmission signal and a reception signal, the signal processing unit 10' may detect vibrations of the target device based on the displacement of the subject or detect a heartbeat of a human or an animal that is the subject.

As described above, the electronic device 1 according to one embodiment makes it possible to detect vibrations of an apparatus well, for example. Therefore, the electronic device 1 according to one embodiment makes it possible to detect vibrations of an apparatus by transmitting and receiving a radio wave or the like and to use it for estimating the status of the apparatus.

As described above, the electronic device 1 according to one embodiment makes it possible to detect faint and weak oscillations such as, for example, a heartbeat in a human body. Therefore, with the electronic device 1 according to one embodiment, for example, a heartbeat in a human body or the like can be detected with good accuracy through transmission and reception of a radio wave or the like.

(Effects Produced by the Operation of the Electronic Device 1)

The effects of object detection by the electronic device 1 according to one embodiment will now be further described below.

Figure 16:
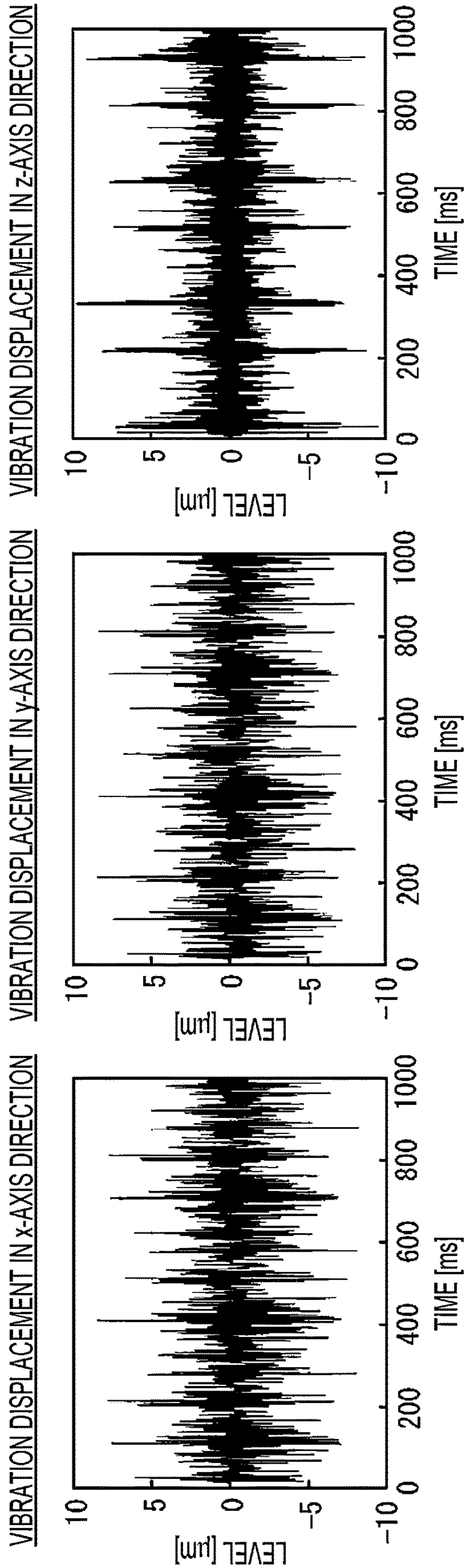
FIG. 16 is a diagram illustrating an example of processing of a signal by the electronic device 1 according to one embodiment.

In related art, it has been difficult to detect the displacement (a velocity and/or an acceleration) of vibrations of an object in a three-dimensional manner by using an ordinary radar sensor. The electronic device 1 according to one embodiment makes it possible to detect displacement of vibration of the subject in a three-dimensional manner, for example, as illustrated in FIG. 16. FIG. 16 is a graph illustrating an example in which the electronic device 1 according to one embodiment acquires, for one second, displacement of vibration in the x-axis direction, the y-axis direction, and the z-axis direction of the same vibrating body detected as one point. The displacement of vibration in each axis direction includes frequency components correlating to those of the others. For this reason, in time-series waveforms of displacement traveled by an object that vibrates, there is a similar portion in the respective directions of axes.

On the other hand, in the time-series waveforms in the respective directions of axes of the displacement traveled by the object that vibrates, frequency configurations and/or overall vibration displacement levels are different from one another.

As described here, the electronic device 1 according to one embodiment makes it possible to detect, for example, by using a radar, displacement traveled by an object that vibrates (a velocity and/or an acceleration), in a three-dimensional manner. Therefore, with the electronic device 1 according to one embodiment, for example, vibrations of an apparatus can be detected with good accuracy. With the electronic device 1 according to one embodiment, for example, a heartbeat in a human body or the like can be detected with good accuracy through transmission and reception of a radio wave or the like.

Other Embodiments

Other embodiments will be described below.

In the example illustrated in FIG. 10, the respective orientations of the reception antenna arrays 31 of the electronic device 1 according to one embodiment have been described as being orthogonal to one another. However, in one embodiment, the reception antenna arrays 31 of the electronic device 1 according to one embodiment may be disposed such that their orientations are not orthogonal to one another. When the reception antenna arrays 31 are disposed such that their orientations are not orthogonal to one another as described here, projection onto the x, y, and z directions can be performed respectively on the basis of information about angles at which the reception antenna arrays 31 are disposed respectively, as done in the foregoing description. The electronic device 1 according to one embodiment can calculate the vectors $d_{v,x}$, $d_{v,y}$, and $d_{v,z}$ of the respective directions through this processing.

In the example illustrated in FIG. 10, the transmission antenna array 24 and each of the reception antenna arrays 31 have been described as being housed in one radar module. However, in the electronic device 1 according to one embodiment, the transmission antenna array 24 and the reception antenna arrays 31 may be housed in a plurality of radar modules in a separated manner as needed.

In the example illustrated in FIG. 10, the electronic device 1 according to one embodiment has been described as including three reception antenna arrays 31. However, the electronic device 1 according to one embodiment may include, for example, two reception antenna arrays 31, thereby detecting vibrations of an object in a two-dimensional manner.

In the example illustrated in FIG. 15, the electronic device 1 according to one embodiment has been described as outputting, to the external device 60, information regarding displacement traveled by an object that vibrates. However, the electronic device 1 according to one embodiment may perform outputting by calculating, at the signal processing unit 10', based on displacement traveled by an object that vibrates, information regarding a velocity at which the object vibrates and/or an acceleration at which the object vibrates, etc.

Figure 17:
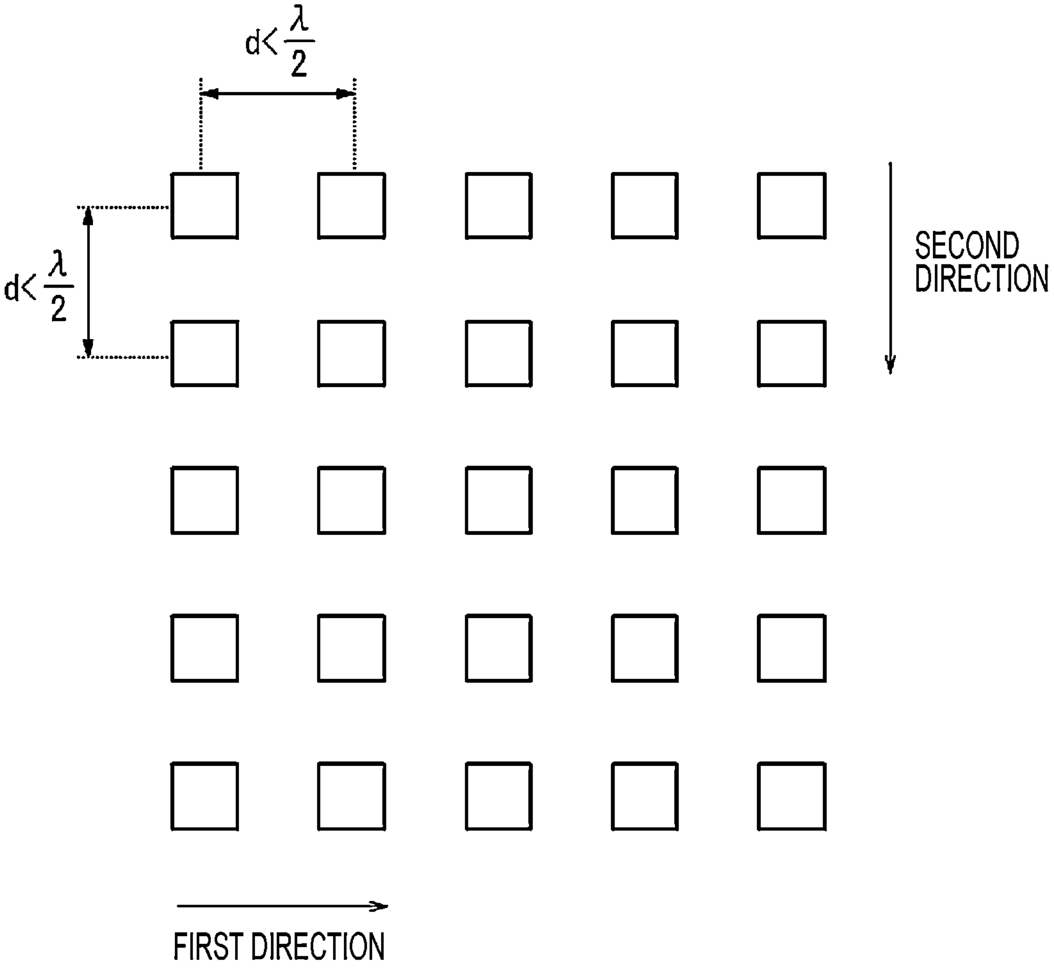
FIG. 17 is a diagram illustrating an example of arrangement of antennas in an antenna array of the electronic device 1 according to one embodiment.

In one embodiment, the layout of the transmission antenna array 24 and/or the reception antenna array 31 of the electronic device 1 is not limited to the layout illustrated in FIG. 8. For example, in one embodiment, the reception antenna array 31 of the electronic device 1 may have a configuration illustrated in FIG. 17. FIG. 17 is a diagram illustrating an example of a URA (uniform rectangular array) reception antenna. By adopting the URA reception antenna such as one illustrated in FIG. 17, the direction-of-arrival estimation of two angles may be performed using the URA reception antenna alone, without changing the directivity by means of a beam former in the transmission antenna array 24.

In the electronic device 100 illustrated in FIG. 2, the signal processing unit 10 has been described as including functional units such as the heartbeat extraction unit 13 and the calculation unit 14. However, in one embodiment, the processing performed by the heartbeat extraction unit 13 and/or the calculation unit 14 may be performed by an external computer, an external processor, or the like.

While the present disclosure has been described based on various drawings and embodiments, it is to be noted that a person skilled in the art can easily make various variations or changes based on the present disclosure. Therefore, it is to be noted that these variations or changes are within the scope of the present disclosure. For example, functions and the like included in each functional unit can be reconfigured without causing any logical contradiction. A plurality of functional units or the like may be combined into one or may be divided. Each embodiment according to the present disclosure described above is not limited to strict implementation in accordance with each description of the embodiment, and may be implemented by appropriately combining the features or omitting a part thereof. That is, based on the present disclosure, a person skilled in the art can make various variations and changes to the content of the present disclosure. Therefore, the scope of the present disclosure encompasses these variations and changes. For example, in each embodiment, each functional unit, each means, each step, or the like can be added to another embodiment or replaced with each functional unit, each means, each step, or the like in another embodiment without causing any logical contradiction. In each embodiment, a plurality of functional units, means, steps, or the like may be combined into one or may be divided. Each embodiment according to the present disclosure described above is not limited to strict implementation in accordance with each description of the embodiment, and may be implemented by appropriately combining the features or omitting a part thereof.

The embodiments described above are not limited to implementation as the electronic device 1. For example, the embodiments described above may be implemented as a method for controlling a device such as the electronic device 1. For example, the embodiments described above may be implemented as a program to be run by a device such as the electronic device 1. The device that runs the program may be various kinds of electronic device capable of running the program, for example, a computer, an arithmetic processor, an information processing apparatus, or the like. The embodiments described above may be implemented as, for example, a storage medium storing a program to be run by a computer of a system or a device described above, that is, may be implemented as a computer-readable storage medium.

The electronic device 1 according to the above embodiments has been described as a device that includes components constituting a so-called radar sensor, such as the transmission antenna array 24 and the reception antenna array 31. However, the electronic device according to one embodiment may be implemented as a component such as, for example, the signal processing unit 10'. In this case, for example, the signal processing unit 10' may have a function for processing signals dealt with by the transmission antenna array 24 and the reception antenna array 31.

REFERENCE SIGNS

1 electronic device
10 signal processing unit
11 signal generation processing unit
12 reception signal processing unit
13 coordinate transformation processing unit
14 vibration displacement extraction processing unit
15 vibration change synthesis processing unit
21 transmission DAC
22 transmission circuit
23 millimeter-wave transmission circuit
24 transmission antenna array
31 reception antenna array
32 mixer
33 reception circuit
34 reception ADC
50 communication interface
60 external device
100 electronic device
200 target device

The invention claimed is:

1. An electronic device, comprising:

a transmission antenna configured to transmit a transmission wave;

a plurality of reception antenna arrays each including a plurality of reception antennas each configured to receive a reflected wave, the reflected wave being the transmission wave having been reflected by a target; and a signal processor configured to detect, based on a transmission signal transmitted as the transmission wave and a reception signal received as the reflected wave, displacement of the target reflecting the transmission wave, wherein, in a three-dimensional space including an x-axis, a y-axis, and a z-axis, the plurality of reception antenna arrays includes:

a first reception antenna array arranged at a first position on a first plane among an XY plane of the x-axis and the y-axis, a YZ plane of the y-axis and the z-axis, and a ZX plane of the x-axis and the z-axis, and a second reception antenna array arranged at a second position on a second plane among the XY plane, the YZ plane, and the ZX plane that is different from the first plane, and the signal processor, in a global coordinate system at which a center of the transmission antenna is taken as a reference relative to the first position and the second position, synthesizes the displacement of the target based on first point-group coordinates relative to the reference detected by the first reception antenna according to first distance and direction estimation of the target relative to the first reception antenna and second point-group coordinates relative to the reference detected by the second reception antenna according to second distance and direction estimation of the target relative to the second reception antenna, and outputs the displacement of the target in a three-dimensional manner based on a result of the synthesizing.

2. The electronic device according to claim 1, wherein the plurality of reception antenna arrays is arranged in such a manner that each direction orthogonal to a direction in which the plurality of reception antennas is arranged in each of the plurality of reception antenna arrays is different from those of others of the plurality of reception antenna arrays.

3. The electronic device according to claim 1, wherein the plurality of reception antenna arrays is each configured as a plane antenna, and is arranged in such a manner that directions of lines normal to the plane antennas are different from one another.

4. The electronic device according to claim 1, wherein each reception antenna array among the plurality of reception antenna arrays is arranged in such a manner that directions perpendicular to receiving surfaces of the plurality of reception antenna arrays are different from one another.

5. The electronic device according to claim 1, wherein the signal processor synthesizes the displacement, after performing coordinate transformation thereof into the global coordinate system, of the target detected by each of the plurality of reception antenna arrays.

6. The electronic device according to claim 5, wherein the signal processor synthesizes the displacement, after performing the coordinate transformation thereof by using a transformation matrix that is based on Euler angles, of the target detected by each of the plurality of reception antenna arrays.

7. The electronic device according to claim 1, wherein based on the transmission signal and the reception signal, the signal processor detects oscillations of the target.

8. The electronic device according to claim 1, wherein based on the transmission signal and the reception signal, the signal processor detects vibrations of an apparatus that is the target.

9. The electronic device according to claim 1, wherein based on the transmission signal and the reception signal, the signal processor detects a heartbeat of a human or an animal that is the target.

10. The electronic device according to claim 1, wherein the plurality of reception antenna arrays includes a third reception antenna array arranged at a third position on a third plane among the XY plane, the YZ plane, and the ZX plane that is different from the first plane and the second plane, and the signal processor synthesizes the displacement of the target detected by the first reception antenna, the second reception antenna, and the third reception antenna, in the global coordinate system.

11. A method for controlling an electronic device, comprising:

transmitting a transmission wave from a transmission antenna;

receiving a reflected wave, the reflected wave being the transmission wave having been reflected by a target, via a plurality of reception antenna arrays each including a plurality of reception antennas, wherein, in a three-dimensional space including an x-axis, a y-axis, and a z-axis, the plurality of reception antenna arrays includes:

a first reception antenna array arranged at a first position on a first plane among an XY plane of the x-axis and the y-axis, a YZ plane of the y-axis and the z-axis, and a ZX plane of the x-axis and the z-axis, and a second reception antenna array arranged at a second position on a second plane among the XY plane, the YZ plane, and the ZX plane that is different from the first plane;

detecting, based on a transmission signal transmitted as the transmission wave and a reception signal received as the reflected wave, a displacement of a target reflecting the transmission wave;

in a global coordinate system at which a center of the transmission antenna is taken as a reference relative to the first position and the second position, synthesizing the displacement of the target based on first point-group coordinates relative to the reference detected by the first reception antenna according to first distance and direction estimation of the target relative to the first reception antenna and second point-group coordinates relative to the reference detected by the second reception antenna according to second distance and direction estimation of the target relative to the second reception antenna; and outputting the displacement of the target in a three-dimensional manner based on a result of the synthesizing.

12. A non-transitory computer-readable recording medium storing computer program instructions, which when executed by an electronic device, cause the electronic device to:

transmit a transmission wave from a transmission antenna;

receive a reflected wave, the reflected wave being the transmission wave having been reflected by a target, via a plurality of reception antenna arrays each including a plurality of reception antennas, wherein, in a three-dimensional space including an x-axis, a y-axis, and a z-axis, the plurality of reception antenna arrays includes:

a first reception antenna array arranged at a first position on a first plane among an XY plane of the x-axis and the y-axis, a YZ plane of the y-axis and the z-axis, and a ZX plane of the x-axis and the z-axis, and a second reception antenna array arranged at a second position on a second plane among the XY plane, the YZ plane, and the ZX plane that is different from the first plane;

detect, based on a transmission signal transmitted as the transmission wave and a reception signal received as the reflected wave, a displacement of a target reflecting the transmission wave;

in a global coordinate system at which a center of the transmission antenna is taken as a reference relative to the first position and the second position, synthesize the displacement of the target based on first point-group coordinates relative to the reference detected by the first reception antenna according to first distance and direction estimation of the target relative to the first reception antenna and second point-group coordinates relative to the reference detected by the second reception antenna according to second distance and direction estimation of the target relative to the second reception antenna; and output the displacement of the target in a three-dimensional manner based on a result of the synthesizing.

* * * * *